(12) United States Patent
Holladay et al.

(10) Patent No.: US 7,672,944 B1
(45) Date of Patent: Mar. 2, 2010

(54) METHOD AND SYSTEM FOR MULTIPLE COLUMN/ROW DATA SORTING IN A DISPLAY TABLE

(75) Inventors: Walter Holladay, Lindon, UT (US);
Lynn D. LeBaron, Highland, UT (US);
Mark R. Tyler, Orem, UT (US); Kirk Arthur Lee, Cedar Hills, UT (US)

(73) Assignee: Intuit Inc., Mountain View, CA (US)

( * ) Notice: Subject to any disclaimer, the term of this patent is extended or adjusted under 35 U.S.C. 154(b) by 447 days.

(21) Appl. No.: 11/625,250

(22) Filed: Jan. 19, 2007

(51) Int. Cl.
*G06F 7/00* (2006.01)
(52) U.S. Cl. .................................................. 707/7
(58) Field of Classification Search ................. 707/7
See application file for complete search history.

(56) References Cited

U.S. PATENT DOCUMENTS

| 6,631,402 | B1 * | 10/2003 | Devine et al. ........... 709/217 |
| 2002/0070953 | A1 * | 6/2002 | Barg et al. ............. 345/700 |
| 2006/0265413 | A1 * | 11/2006 | Blencowe ............... 707/102 |
| 2006/0294069 | A1 * | 12/2006 | Carlson et al. ............ 707/3 |

* cited by examiner

*Primary Examiner*—Charles Rones
*Assistant Examiner*—Fazlul Quader
(74) *Attorney, Agent, or Firm*—Gunnison, McKay & Hodgson, L.L.P.; Philip J. McKay

(57) ABSTRACT

A method and system for multiple column/row data sorting includes a process for multiple column/row data sorting whereby a user is provided with a simple and visually intuitive interface for prioritizing the progressive sorting of data displayed in data tables by multiple columns or rows.

42 Claims, 21 Drawing Sheets

300

| | Last Name | FIRST NAME | DOB | DOH |
|---|---|---|---|---|
| 341 | SMITH | SCOTT | 11/30/1977 | 1/1/2000 |
| | ADAMS | KATHY | 5/1/1987 | 1/1/2000 |
| | JONES | PAULA | 6/6/1986 | 1/1/2000 |
| 343 | SMITH | JOHN | 11/30/1903 | 1/20/2000 |
| | DAVIS | OSWALD | 8/13/1979 | 4/8/2001 |
| | PARK | WILLIAM | 5/15/1966 | 6/15/2001 |
| | LEE | KIMBERLY | 9/14/1955 | 1/1/2002 |
| 345 | SMITH | JOHN | 4/08/1959 | 2/1/2003 |
| | JAMES | STEVEN | 10/31/72 | 3/1/2003 |
| | SAMSON | LISA | 12/25/1970 | 4/1/2004 |
| | ABRAHAMS | DAVID | 2/14/1961 | 5/14/2005 |
| 349 | SMITH | PAUL | 3/29/1967 | 5/14/2005 |
| | McKAY | SAVANNAH | 6/15/1988 | 1/1/2006 |
| | LEWIS | SEAN | 11/30/1959 | 2/2/2006 |
| 347 | SMITH | JOHN | 7/04/1976 | 1/1/2007 |

Columns: 321, 323, 325, 327

| | 321 | 351 | 323 | 325 | 327 |
|---|---|---|---|---|---|
| | Last Name | 1 | FIRST NAME | DOB | DOH |
| 341 | SMITH | | 305 SCOTT | 11/30/1977 | 1/1/2000 |
| | ADAMS | | KATHY | 5/1/1987 | 1/1/2000 |
| | JONES | | PAULA | 6/6/1986 | 1/1/2000 |
| 343 | SMITH | | JOHN | 11/30/1983 | 1/20/2000 |
| | DAVIS | | OSWALD | 8/13/1979 | 4/8/2001 |
| | PARK | | WILLIAM | 5/15/1966 | 6/15/2001 |
| | LEE | | KIMBERLY | 9/14/1955 | 1/1/2002 |
| 345 | SMITH | | JOHN | 4/08/1959 | 2/1/2003 |
| | JAMES | | STEVEN | 10/31/72 | 3/1/2003 |
| | SAMSON | | LISA | 12/25/1970 | 4/1/2004 |
| | ABRAHAMS | | DAVID | 2/14/1961 | 5/14/2005 |
| 349 | SMITH | | PAUL | 3/29/1967 | 5/14/2005 |
| | McKAY | | SAVANNAH | 6/15/1988 | 1/1/2006 |
| | LEWIS | | SEAN | 11/30/1959 | 2/2/2006 |
| 347 | SMITH | | JOHN | 7/04/1976 | 1/1/2007 |

| 321 | 351 | 323 | 325 | 327 |
|---|---|---|---|---|
| Last Name | 1 | FIRST NAME | DOB | DOH |
| ADAMS | | KATHY | 5/1/1987 | 1/1/2000 |
| ABRAHAMS | | DAVID | 2/14/1961 | 5/14/2005 |
| DAVIS | | OSWALD | 8/13/1979 | 4/8/2001 |
| JAMES | | STEVEN | 10/31/72 | 3/1/2003 |
| JONES | | PAULA | 6/6/1986 | 1/1/2000 |
| LEE | | KIMBERLY | 9/14/1955 | 1/1/2002 |
| LEWIS | | SEAN | 11/30/1959 | 2/2/2006 |
| McKAY | | SAVANNAH | 6/15/1988 | 1/1/2006 |
| PARK | | WILLIAM | 5/15/1966 | 6/15/2001 |
| SAMSON | | LISA | 12/25/1970 | 4/1/2004 |
| SMITH | | JOHN | 4/08/1959 | 2/1/2003 |
| SMITH | | PAUL | 3/29/1967 | 5/14/2005 |
| SMITH | | JOHN | 11/30/1983 | 1/20/2000 |
| SMITH | | SCOTT | 11/30/1977 | 1/1/2000 |
| SMITH | | JOHN | 7/04/1976 | 1/1/2007 |

| 321 | 351 | 323 | 352 | 325 | 327 |
|---|---|---|---|---|---|
| Last Name | 1 | FIRST NAME | 2 | DOB | DOH |
| ADAMS | | KATHY  305 | | 5/1/1987 | 1/1/2000 |
| ABRAHAMS | | DAVID | | 2/14/1961 | 5/14/2005 |
| DAVIS | | OSWALD | | 8/13/1979 | 4/8/2001 |
| JAMES | | STEVEN | | 10/31/72 | 3/1/2003 |
| JONES | | PAULA | | 6/6/1986 | 1/1/2000 |
| LEE | | KIMBERLY | | 9/14/1955 | 1/1/2002 |
| LEWIS | | SEAN | | 11/30/1959 | 2/2/2006 |
| McKAY | | SAVANNAH | | 6/15/1988 | 1/1/2006 |
| PARK | | WILLIAM | | 5/15/1966 | 6/15/2001 |
| SAMSON | | LISA | | 12/25/1970 | 4/1/2004 |
| 345  SMITH | | JOHN | | 4/08/1959 | 2/1/2003 |
| 349  SMITH | | PAUL | | 3/29/1967 | 5/14/2005 |
| 343  SMITH | | JOHN | | 11/30/1983 | 1/20/2000 |
| 341  SMITH | | SCOTT | | 11/30/1977 | 1/1/2000 |
| 347  SMITH | | JOHN | | 7/04/1976 | 1/1/2007 |

| 301 | | | |
|---|---|---|---|
| 321　　　351　323　　　　　352　325　　　　327 | | | |
| Last Name　[1] | FIRST NAME　[2] | DOB | DOH |
| ADAMS | KATHY | 5/1/1987 | 1/1/2000 |
| ABRAHAMS | DAVID | 2/14/1961 | 5/14/2005 |
| DAVIS | OSWALD | 8/13/1979 | 4/8/2001 |
| JAMES | STEVEN | 10/31/72 | 3/1/2003 |
| JONES | PAULA | 6/6/1986 | 1/1/2000 |
| LEE | KIMBERLY | 9/14/1955 | 1/1/2002 |
| LEWIS | SEAN | 11/30/1959 | 2/2/2006 |
| McKAY | SAVANNAH | 6/15/1988 | 1/1/2006 |
| PARK | WILLIAM | 5/15/1966 | 6/15/2001 |
| SAMSON | LISA | 12/25/1970 | 4/1/2004 |
| 345　SMITH | JOHN | 4/08/1959 | 2/1/2003 |
| 343　SMITH | JOHN | 11/30/1983 | 1/20/2000 |
| 347　SMITH | JOHN | 7/04/1976 | 1/1/2007 |
| 349　SMITH | PAUL | 3/29/1967 | 5/14/2005 |
| 341　SMITH | SCOTT | 11/30/1977 | 1/1/2000 |

| | | | |
|---|---|---|---|
| Last Name  1 | FIRST NAME  2 | DOB  3 | DOH |
| ADAMS | KATHY | 5/1/1987 | 1/1/2000 |
| ABRAHAMS | DAVID | 2/14/1961 | 5/14/2005 |
| DAVIS | OSWALD | 8/13/1979 | 4/8/2001 |
| JAMES | STEVEN | 10/31/72 | 3/1/2003 |
| JONES | PAULA | 6/6/1986 | 1/1/2000 |
| LEE | KIMBERLY | 9/14/1955 | 1/1/2002 |
| LEWIS | SEAN | 11/30/1959 | 2/2/2006 |
| McKAY | SAVANNAH | 6/15/1988 | 1/1/2006 |
| PARK | WILLIAM | 5/15/1966 | 6/15/2001 |
| SAMSON | LISA | 12/25/1970 | 4/1/2004 |
| SMITH | JOHN | 4/08/1959 | 2/1/2003 |
| SMITH | JOHN | 11/30/1983 | 1/20/2000 |
| SMITH | JOHN | 7/04/1976 | 1/1/2007 |
| SMITH | PAUL | 3/29/1967 | 5/14/2005 |
| SMITH | SCOTT | 11/30/1977 | 1/1/2000 |

| 321 | 351 | 323 | 352 | 325 | 353 | 327 |
|---|---|---|---|---|---|---|
| Last Name | 1 | FIRST NAME | 2 | DOB | 3 | DOH |
| ADAMS | | KATHY | | 5/1/1987 | | 1/1/2000 |
| ABRAHAMS | | DAVID | | 2/14/1961 | | 5/14/2005 |
| DAVIS | | OSWALD | | 8/13/1979 | | 4/8/2001 |
| JAMES | | STEVEN | | 10/31/72 | | 3/1/2003 |
| JONES | | PAULA | | 6/6/1986 | | 1/1/2000 |
| LEE | | KIMBERLY | | 9/14/1955 | | 1/1/2002 |
| LEWIS | | SEAN | | 11/30/1959 | | 2/2/2006 |
| McKAY | | SAVANNAH | | 6/15/1988 | | 1/1/2006 |
| PARK | | WILLIAM | | 5/15/1966 | | 6/15/2001 |
| SAMSON | | LISA | | 12/25/1970 | | 4/1/2004 |
| SMITH | | JOHN | | 4/08/1959 | | 2/1/2003 |
| SMITH | | JOHN | | 7/04/1976 | | 1/1/2007 |
| SMITH | | JOHN | | 11/30/1983 | | 1/20/2000 |
| SMITH | | PAUL | | 3/29/1967 | | 5/14/2005 |
| SMITH | | SCOTT | | 11/30/1977 | | 1/1/2000 |

| 301 | | | | | | | |
|---|---|---|---|---|---|---|---|
| 321 | 351 | 323 | 353 | 325 | 352 | 327 | 305 |
| Last Name | 1 | FIRST NAME | 3 | DOB | 2 | DOH | |
| ADAMS | | KATHY | | 5/1/1987 | | 1/1/2000 | |
| ABRAHAMS | | DAVID | | 2/14/1961 | | 5/14/2005 | |
| DAVIS | | OSWALD | | 8/13/1979 | | 4/8/2001 | |
| JAMES | | STEVEN | | 10/31/72 | | 3/1/2003 | |
| JONES | | PAULA | | 6/6/1986 | | 1/1/2000 | |
| LEE | | KIMBERLY | | 9/14/1955 | | 1/1/2002 | |
| LEWIS | | SEAN | | 11/30/1959 | | 2/2/2006 | |
| McKAY | | SAVANNAH | | 6/15/1988 | | 1/1/2006 | |
| PARK | | WILLIAM | | 5/15/1966 | | 6/15/2001 | |
| SAMSON | | LISA | | 12/25/1970 | | 4/1/2004 | |
| SMITH (345) | | JOHN | | 4/08/1959 | | 2/1/2003 | |
| SMITH (349) | | PAUL | | 3/29/1967 | | 5/14/2005 | |
| SMITH (347) | | JOHN | | 7/04/1976 | | 1/1/2007 | |
| SMITH (341) | | SCOTT | | 11/30/1977 | | 1/1/2000 | |
| SMITH (343) | | JOHN | | 11/30/1983 | | 1/20/2000 | |

| | 521 Last Name | 523 FIRST NAME | 525 DOB | 527 DOH |
|---|---|---|---|---|
| 541 | SMITH | SCOTT | 11/30/1977 | 1/1/2000 |
| | ADAMS | KATHY | 5/1/1987 | 1/1/2000 |
| | JONES | PAULA | 6/6/1986 | 1/1/2000 |
| 543 | SMITH | JOHN | 11/30/1983 | 1/20/2000 |
| | DAVIS | OSWALD | 8/13/1979 | 4/8/2001 |
| | PARK | WILLIAM | 5/15/1966 | 6/15/2001 |
| | LEE | KIMBERLY | 9/14/1955 | 1/1/2002 |
| 545 | SMITH | JOHN | 4/08/1959 | 2/1/2003 |
| | JAMES | STEVEN | 10/31/72 | 3/1/2003 |
| | SAMSON | LISA | 12/25/1970 | 4/1/2004 |
| | ABRAHAMS | DAVID | 2/14/1961 | 5/14/2005 |
| 549 | SMITH | PAUL | 3/29/1967 | 5/14/2005 |
| | McKAY | SAVANNAH | 6/15/1988 | 1/1/2006 |
| | LEWIS | SEAN | 11/30/1959 | 2/2/2006 |
| 547 | SMITH | JOHN | 7/04/1976 | 1/1/2007 |

| | 521 Last Name | 523 FIRST NAME | 525 DOB | 527 DOH |
|---|---|---|---|---|
| 541 | SMITH | SCOTT | 11/30/1977 | 1/1/2000 |
| | ADAMS | KATHY | 5/1/1987 | 1/1/2000 |
| | JONES | PAULA | 6/6/1986 | 1/1/2000 |
| 543 | SMITH | JOHN | 11/30/1983 | 1/20/2000 |
| | DAVIS | OSWALD | 8/13/1979 | 4/8/2001 |
| | PARK | WILLIAM | 5/15/1966 | 6/15/2001 |
| | LEE | KIMBERLY | 9/14/1955 | 1/1/2002 |
| 545 | SMITH | JOHN | 4/08/1959 | 2/1/2003 |
| | JAMES | STEVEN | 10/31/72 | 3/1/2003 |
| | SAMSON | LISA | 12/25/1970 | 4/1/2004 |
| | ABRAHAMS | DAVID | 2/14/1961 | 5/14/2005 |
| 549 | SMITH | PAUL | 3/29/1967 | 5/14/2005 |
| | McKAY | SAVANNAH | 6/15/1988 | 1/1/2006 |
| | LEWIS | SEAN | 11/30/1959 | 2/2/2006 |
| 547 | SMITH | JOHN | 7/04/1976 | 1/1/2007 |

| 521 | 507 | 523 | 525 | 527 |
|---|---|---|---|---|
| Last Name | 1 | FIRST NAME | DOB | DOH |
| 541 SMITH | | SCOTT | 11/30/1977 | 1/1/2000 |
| ADAMS | | KATHY | 5/1/1987 | 1/1/2000 |
| JONES | | PAULA | 6/6/1986 | 1/1/2000 |
| 543 SMITH | | JOHN | 11/30/1983 | 1/20/2000 |
| DAVIS | | OSWALD | 8/13/1979 | 4/8/2001 |
| PARK | | WILLIAM | 5/15/1966 | 6/15/2001 |
| LEE | | KIMBERLY | 9/14/1955 | 1/1/2002 |
| 545 SMITH | | JOHN | 4/08/1959 | 2/1/2003 |
| JAMES | | STEVEN | 10/31/72 | 3/1/2003 |
| SAMSON | | LISA | 12/25/1970 | 4/1/2004 |
| ABRAHAMS | | DAVID | 2/14/1961 | 5/14/2005 |
| 549 SMITH | | PAUL | 3/29/1967 | 5/14/2005 |
| McKAY | | SAVANNAH | 6/15/1988 | 1/1/2006 |
| LEWIS | | SEAN | 11/30/1959 | 2/2/2006 |
| 547 SMITH | | JOHN | 7/04/1976 | 1/1/2007 |

| 521 | 507 | 523 | 525 | 527 |
| --- | --- | --- | --- | --- |
| Last Name | 1 | FIRST NAME | DOB | DOH |
| ADAMS | | KATHY | 5/1/1987 | 1/1/2000 |
| ABRAHAMS | | DAVID | 2/14/1961 | 5/14/2005 |
| DAVIS | | OSWALD | 8/13/1979 | 4/8/2001 |
| JAMES | | STEVEN | 10/31/72 | 3/1/2003 |
| JONES | | PAULA | 6/6/1986 | 1/1/2000 |
| LEE | | KIMBERLY | 9/14/1955 | 1/1/2002 |
| LEWIS | | SEAN | 11/30/1959 | 2/2/2006 |
| McKAY | | SAVANNAH | 6/15/1988 | 1/1/2006 |
| PARK | | WILLIAM | 5/15/1966 | 6/15/2001 |
| SAMSON | | LISA | 12/25/1970 | 4/1/2004 |
| 545 SMITH | | JOHN | 4/08/1959 | 2/1/2003 |
| 549 SMITH | | PAUL | 3/29/1967 | 5/14/2005 |
| 543 SMITH | | JOHN | 11/30/1983 | 1/20/2000 |
| 541 SMITH | | SCOTT | 11/30/1977 | 1/1/2000 |
| 547 SMITH | | JOHN | 7/04/1976 | 1/1/2007 |

| 521 | 551 | 523 | 509 | 525 | 527 |
|---|---|---|---|---|---|
| Last Name | 1 | FIRST NAME | 2 | DOB | DOH |
| ADAMS | | KATHY | | 5/1/1987 | 1/1/2000 |
| ABRAHAMS | | DAVID | | 2/14/1961 | 5/14/2005 |
| DAVIS | | OSWALD | | 8/13/1979 | 4/8/2001 |
| JAMES | | STEVEN | | 10/31/72 | 3/1/2003 |
| JONES | | PAULA | | 6/6/1986 | 1/1/2000 |
| LEE | | KIMBERLY | | 9/14/1955 | 1/1/2002 |
| LEWIS | | SEAN | | 11/30/1959 | 2/2/2006 |
| McKAY | | SAVANNAH | | 6/15/1988 | 1/1/2006 |
| PARK | | WILLIAM | | 5/15/1966 | 6/15/2001 |
| SAMSON | | LISA | | 12/25/1970 | 4/1/2004 |
| SMITH | | JOHN | | 4/08/1959 | 2/1/2003 |
| SMITH | | PAUL | | 3/29/1967 | 5/14/2005 |
| SMITH | | JOHN | | 11/30/1983 | 1/20/2000 |
| SMITH | | SCOTT | | 11/30/1977 | 1/1/2000 |
| SMITH | | JOHN | | 7/04/1976 | 1/1/2007 |

545 SMITH (row)
549 SMITH PAUL
543 SMITH JOHN
541 SMITH SCOTT
547 SMITH JOHN

FIG.5F

METHOD AND SYSTEM FOR MULTIPLE COLUMN/ROW DATA SORTING IN A DISPLAY TABLE

BACKGROUND

Many computing system implemented data and/or word processing programs, applications, processes, and/or systems utilize data tables for the processing and displaying of data. A typical data table includes data arranged in columns and rows with the columns or rows having headings indicating the subject matter/content displayed in the column or row. When viewing and/or interacting with data arranged in tables it is often highly desirable to sort the data based on the subject matter/content in the columns and/or rows.

As an example, assume a listing of employees is presented in a data table. For this example, further assume that the data table is partitioned into columns including a first column showing the employee's last name, a second column showing employee's first name, and a third column showing the employee's birth date. When viewing, or interacting, with data table it may often be highly desirable to the user to sort the employees by last name. Typically, this would be accomplished through a user interface and user interface device whereby the user would designate the first column, i.e., the employee's last name column, as the sort subject matter/content. Typically this would be accomplished by clicking on an icon, or the column heading of the column, the user wishes to sort by, and then selecting, or entering, a sort order or, in some cases, the order might be automatically selected, such as an alphabetical listing A to Z or Z to A.

In many instances however it would be equally desirable to, in addition to sorting by the last name, to sort the data table by the second column, or the first name, as well. For instance, continuing with the example discussed above, a user may wish to sort by last name to see all the employees having a last name Smith grouped together and then the user may further wish refine the display to see all the employees having the last name Smith and the first named John. In addition, a user may wish to see all the employees named John Smith listed by descending, or ascending, birth date. This would involve, in this example, sorting by the third column, employee birth date, in addition to the first two columns, employee last name and employee first name.

Currently, many applications utilizing data tables, and providing a user interface with a data table, only provide for sorting by a single column, or row, at a time. Consequently using many currently available applications, in the example above, the user could first short by the first column and see a listing of all employees with the last name Smith. However, once the user wanted to view all employees sorted by first name, such as John, the sorting by last name would be discarded and the user would be left with a listing of all employees having a first name John, including those named John Smith, but also those employees having other last names. Likewise, continuing with the example above, if the user were to sort by birth date, the sorting by last name, the sorting by first name, or any other previous sorting, would be discarded and the user would be presented with a listing of all employees by ascending, or descending, birth date.

SUMMARY

In accordance with one embodiment, a method and system for multiple column/row data sorting includes a process for multiple column/row data sorting whereby a user is provided with a simple and visually intuitive interface for prioritizing the sorting of data displayed in data tables by multiple columns or rows.

In accordance with one embodiment, a sort icon well is provided on a display screen of a computing system as part of a user interface with data displayed in a data table. In one embodiment, the icon well includes individual sort icons each associated with an order for sorting data. For instance, in one embodiment, the icon well includes, but is not limited to: a primary sort icon, for designating a first or primary sort column or row; a secondary sort icon, for designating a second or secondary sort column or row; a tertiary sort icon, for designating a third or tertiary sort column or row; etc.

In one embodiment, a user selects one of the sort icons using a user interface device, such as a movable interface symbol, for example a cursor, and then drags and drops the selected sort icon to the column or row, or a column or row header, the user desires to designate with the sort icon. The user then repeats the process, using the other sort icons in the sort icon well, to designate a sort priority for all of the columns and/or rows desired. In one embodiment, the data is then sorted according to the priority designated by the sort icons as moved to the various columns or rows. For instance, the data is first sorted by the subject matter of the column to which the primary sort icon was moved. Then, while still maintaining the display of the primary sort, the data is further sorted by the subject matter of the column to which the secondary sort icon was moved. Then, while still maintaining the display of the primary sort and the secondary sort, the data is further sorted by the subject matter of the column to which the tertiary sort icon was moved, and so on. In one embodiment, the sort icons can be moved between rows and columns and/or back into the sort icon well.

In accordance with one embodiment, a movable interface symbol, such as a cursor, is provided as part of an interface for interacting with data arranged in a data table. In one embodiment, the performance of a first designated key or command sequence through a user interface device transforms the movable interface symbol into a movable primary sort symbol. In one embodiment, a first column or row that the user wishes to designate as the primary sort column or row is then selected with the movable primary sort symbol, in one embodiment by clicking on a mouse, thereby designating the first column or row as the primary sort column or row. Then, in one embodiment, the performance of a second designated key or command sequence through the user interface device transforms the movable interface symbol into a movable secondary sort symbol. In one embodiment, a second column or row that the user wishes to designate as the secondary sort column or row is then selected with the movable secondary sort symbol, thereby designating the second column or row as the secondary sort column or row. Then, in one embodiment, the performance of a third designated key or command sequence through the user interface device transforms the movable interface symbol into a movable tertiary sort symbol. In one embodiment, a third column or row that the user wishes to designate as the tertiary sort column or row is then selected with the movable tertiary sort symbol thereby designating the third column or row as the tertiary sort column or row. In one embodiment the process described above is repeated as many times, and for as many levels of sort, as the user desires.

In one embodiment, the data is then sorted according to the priority designated. For instance, the data is sorted by the subject matter of the column/row designated the primary sort column/row. Then, while still maintaining the display of the primary sort, the data is further sorted by the subject matter of the column/row designated the secondary sort column/row.

Then, while still maintaining the display of the primary sort and the secondary sort, the data is further sorted by the subject matter of the column/row designated the tertiary sort column/row, and so on.

Using the method and system for multiple column/row data sorting, and a process for multiple column/row data sorting, disclosed herein, a user is provided with the capability to sort data arranged in data tables by multiple columns or rows simultaneously, and in a progressively refined manner. In addition, using the method and system for multiple column/row data sorting, and a process for multiple column/row data sorting, disclosed herein, the user is provided to capability to prioritize the sorting of the data by multiple columns/rows using a simple and visually intuitive user interface.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 3A shows once embodiment of a user interface screen, including a data table and sort icon well, in accordance with one embodiment;

FIG. 3C shows once embodiment of a user interface screen, including a data table and sort icon well, in accordance with one embodiment;

FIG. 3D shows once embodiment of a user interface screen, including a data table and sort icon well, in accordance with one embodiment;

FIG. 3F shows once embodiment of a user interface screen, including a data table and sort icon well, in accordance with one embodiment;

FIG. 3G shows once embodiment of a user interface screen, including a data table and sort icon well, in accordance with one embodiment;

FIG. 3I shows once embodiment of a user interface screen, including a data table and sort icon well, in accordance with one embodiment;

FIG. 3J shows once embodiment of a user interface screen, including a data table and sort icon well, in accordance with one embodiment;

FIG. 3K shows once embodiment of a user interface screen, including a data table and sort icon well, in accordance with one embodiment;

FIG. 5A shows once embodiment of a user interface screen, including a data table and movable interface/sort symbol, in accordance with one embodiment;

FIG. 5B shows once embodiment of a user interface screen, including a data table and movable interface/sort symbol, in accordance with one embodiment;

FIG. 5C shows once embodiment of a user interface screen, including a data table and movable interface/sort symbol, in accordance with one embodiment;

FIG. 5E shows once embodiment of a user interface screen, including a data table and movable interface/sort symbol, in accordance with one embodiment;

FIG. 5F shows once embodiment of a user interface screen, including a data table and movable interface/sort symbol, in accordance with one embodiment.

Figure 1:
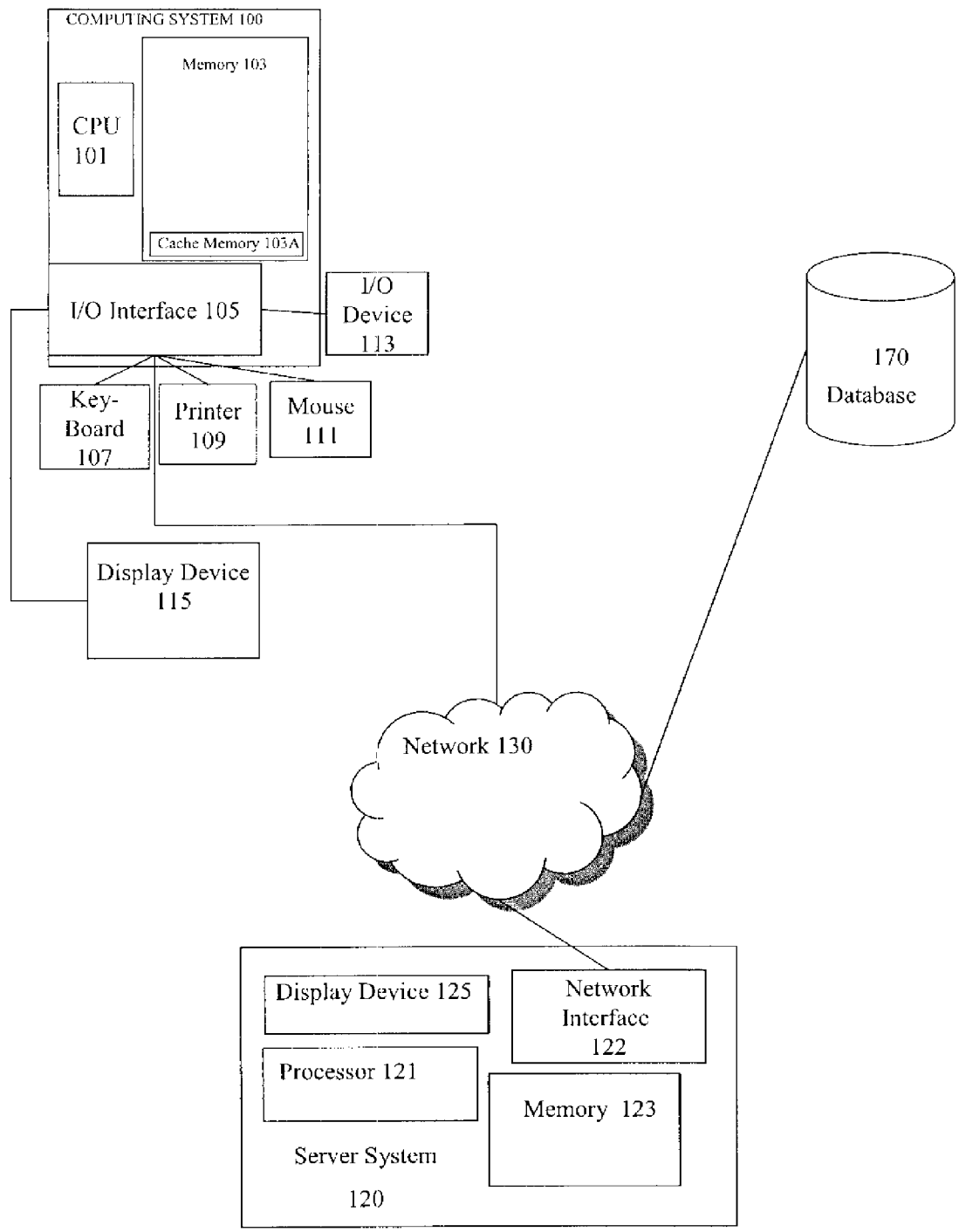
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for multiple column/row data sorting includes a process for multiple column/row data sorting whereby a user is provided with a simple and visually intuitive interface for prioritizing the sorting of data displayed in data tables by multiple columns or rows.

In accordance with one embodiment, a sort icon well is provided on a display screen of a computing system as part of a user interface with data displayed in a data table. In one embodiment, the icon well includes individual sort icons each associated with an order for sorting data. For instance, in one embodiment, the icon well includes, but is not limited to: a primary sort icon, for designating a first or primary sort column or row; a secondary sort icon, for designating a second or secondary sort column or row; a tertiary sort icon, for designating a third or tertiary sort column or row; etc.

In one embodiment, a user selects one of the sort icons using a user interface device, such as a movable interface symbol, for example a cursor, and then drags and drops the selected sort icon to the column or row, or a column or row header, the user desires to designate with the sort icon. The user then repeats the process, using the other sort icons in the sort icon well, to designate a sort priority for all of the columns and/or rows desired. In one embodiment, the data is then sorted according to the priority designated by the sort icons as moved to the various columns or rows. For instance, the data is first sorted by the subject matter of the column to which the primary sort icon was moved. Then, while still maintaining the display of the primary sort, the data is further sorted by the subject matter of the column to which the secondary sort icon was moved. Then, while still maintaining the display of the primary sort and the secondary sort, the data is further sorted by the subject matter of the column to which the tertiary sort icon was moved, and so on. In one embodiment, the sort icons can be moved between rows and columns and/or back into the sort icon well.

In accordance with one embodiment, a movable interface symbol, such as a cursor, is provided as part of an interface for interacting with data arranged in a data table. In one embodiment, the performance of a first designated key or command sequence through a user interface device transforms the movable interface symbol into a movable primary sort symbol. In one embodiment, a first column or row that the user wishes to designate as the primary sort column or row is then selected with the movable primary sort symbol, in one embodiment by clicking on a mouse, thereby designating the first column or row as the primary sort column or row. Then, in one embodiment, the performance of a second designated key or command sequence through the user interface device transforms the movable interface symbol into a movable secondary sort symbol. In one embodiment, a second column or row that the user wishes to designate as the secondary sort column or row is then selected with the movable secondary sort symbol, thereby designating the second column or row as the secondary sort column or row. Then, in one embodiment, the performance of a third designated key or command sequence through the user interface device transforms the movable interface symbol into a movable tertiary sort symbol. In one embodiment, a third column or row that the user wishes to designate as the tertiary sort column or row is then selected with the movable tertiary sort symbol thereby designating the third column or row as the tertiary sort column or row. In one embodiment the process described above is repeated as many times, and for as many levels of sort, as the user desires.

In one embodiment, the data is then sorted according to the priority designated. For instance, the data is for sorted by the subject matter of the column/row designated the primary sort column/row. Then, while still maintaining the display of the primary sort, the data is further sorted by the subject matter of the column/row designated the secondary sort column/row. Then, while still maintaining the display of the primary sort and the secondary sort, the data is further sorted by the subject matter of the column/row designated the tertiary sort column/row, and so on.

Using the method and system for multiple column/row data sorting, and a process for multiple column/row data sorting, disclosed herein, a user is provided with the capability to sort data arranged in data tables by multiple columns or rows simultaneously, and in a progressively refined manner. In addition, using the method and system for multiple column/row data sorting, and a process for multiple column/row data sorting, disclosed herein, the user is provided the capability to prioritize the sorting of the data by multiple columns/rows using a simple and visually intuitive user interface.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of exemplary hardware architecture for implementing one embodiment of a process for multiple column/row data sorting, such as processes for multiple column/row data sorting 200 and 400, discussed below, that includes: a computing system 100; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes all or part of a process for multiple column/row data sorting.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether known at the time of filing or as later developed. As discussed in more detail below, in one embodiment, a process for multiple column/row data sorting can be loaded, in whole, or in part, into computing system 100 via I/O device 113, such as from a CD, DVD or floppy disk containing all, or part, of a process for multiple column/row data sorting.

Also shown in FIG. 1 is database 170. In one embodiment, database 170 is a designated server system or computing system, or a designated portion of a server system or computing system, such as computing systems 100 and 120. In one embodiment, database 170 is a dedicated mass storage device implemented in software, hardware, or a combination of hardware and software. In one embodiment, database 170 is a web-based function. As discussed in more detail below, in one embodiment, a process for multiple column/row data sorting is stored in whole, or in part, in database 170.

In one embodiment, computing system 100 and database 170, are coupled to a server system 120 by network 130. Server system 120 typically includes a server system display device 125, a server system processor 121, a server system memory 123, and a server system network interface 122. As discussed in more detail below, in one embodiment, a process for multiple column/row data sorting is stored in whole, or in part, in server system 120.

Network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether known at the time of filing or as later developed. In various embodiments, server system network interface 122 and I/O interface 105 include analog modems, digital modems, a network interface card, a broadband connection, or any other means for communicably coupling computing system 100, database 170, and server system 120, via network 130, whether known at the time of filing or as later developed.

Those of skill in the art will readily recognize that the components shown in FIG. 1, such as computing system 100, database 170, server system 120, and their respective components, are shown for illustrative purposes only and that architectures with more or fewer components can implement, and benefit from, a process for multiple column/row data sorting, such as processes for multiple column/row data sorting 200 and 400, discussed below. Moreover, one or more components of computing system 100, database 170, and server system 120 may be located remotely from their respective system and accessed via network, as discussed herein. In addition, the particular type of, and configuration of, computing systems 100, database 170, and server system 120 are not relevant.

As discussed in more detail below, in one embodiment, a process for multiple column/row data sorting is stored in whole, or in part, in memory system 103 and/or cache memory 103A, of computing system 100, and/or in server memory system 123 of server system 120 and/or in database 170, and executed on computing system 100. As used herein, a memory refers to a volatile memory, a non-volatile memory, or any combination of the two.

Although a process for multiple column/row data sorting can sometimes be referred to herein, alternatively, as a process, an application, a module, a program, a component of a software system, a component of a software package, a component of a parent system, or a feature of a parent system, this terminology is illustrative only. In some embodiments, a process for multiple column/row data sorting is capable of being called from an application or the operating system. In one embodiment, an application or program is generally defined to be any executable code. Moreover, those of skill in the art will understand that when it is said that an application or an operation takes some action, the action is the result of executing one or more instructions by a processor, such as processor 101, server system processor 121, multiple processors such as processor 101 and server system processor 121, and/or one or more cores of a multi-core processor system. In one embodiment, execution of a process for multiple column/row data sorting by processor 101 or server system processor 121, results in the operations of an agent computer process (not shown) and/or a rule computer process (not shown).

In one embodiment, a process for multiple column/row data sorting is a computer application or process implemented and/or run and/or stored, in full, or in part, in, or on, a computer program product. Herein, a computer program product comprises a medium configured to store and/or transport computer readable code, whether known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether known at the time of filing or as later developed. This medium may belong to a computing system, such as computing system 100 of FIG. 1, described above. However, the medium also may be removed from the computing system.

For example, all, or part, of a process for multiple column/row data sorting may be stored in a memory that is physically located in a location, such as server system memory 123, or database 170, of FIG. 1, different from a computing system, such as computing system 100 of FIG. 1, utilizing a process for multiple column/row data sorting. In one embodiment, all, or part, of a process for multiple column/row data sorting may be stored in a memory that is physically located, separate from the computing system's processor(s), such as processor 101 of FIG. 1, and the computing system processor(s) can be coupled to the memory in a client-server system, such as server system 120 of FIG. 1, or, alternatively, via connection to another computer, such as computing system 100 of FIG. 1, via modems and analog lines, digital interfaces and a digital carrier line, or wireless or cellular connections.

In one embodiment, the computing systems and/or server system, such as computing system 100 and/or server system 120 of FIG. 1, running and/or utilizing and/or storing all, or part, of a process for multiple column/row data sorting is a portable computer, a workstation, a two-way pager, a cellular telephone, a smart phone, a digital wireless telephone, a personal digital assistant, a server computer, an Internet appliance, or any other device that includes components that can execute all, or part, of a process for multiple column/row data sorting in accordance with at least one of the embodiments as described herein. Similarly, in another embodiment, a process for multiple column/row data sorting is implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In accordance with one embodiment, a process for multiple column/row data sorting includes a sort icon well provided on a display screen of a computing system as part of a user interface with data displayed in a data table. In one embodiment, the icon well includes individual sort icons each associated with a prioritized order for sorting data. In one embodiment, the individual sort icons can be manipulated by a user and moved to a desired column or row to prioritize the data sort.

Figure 2:
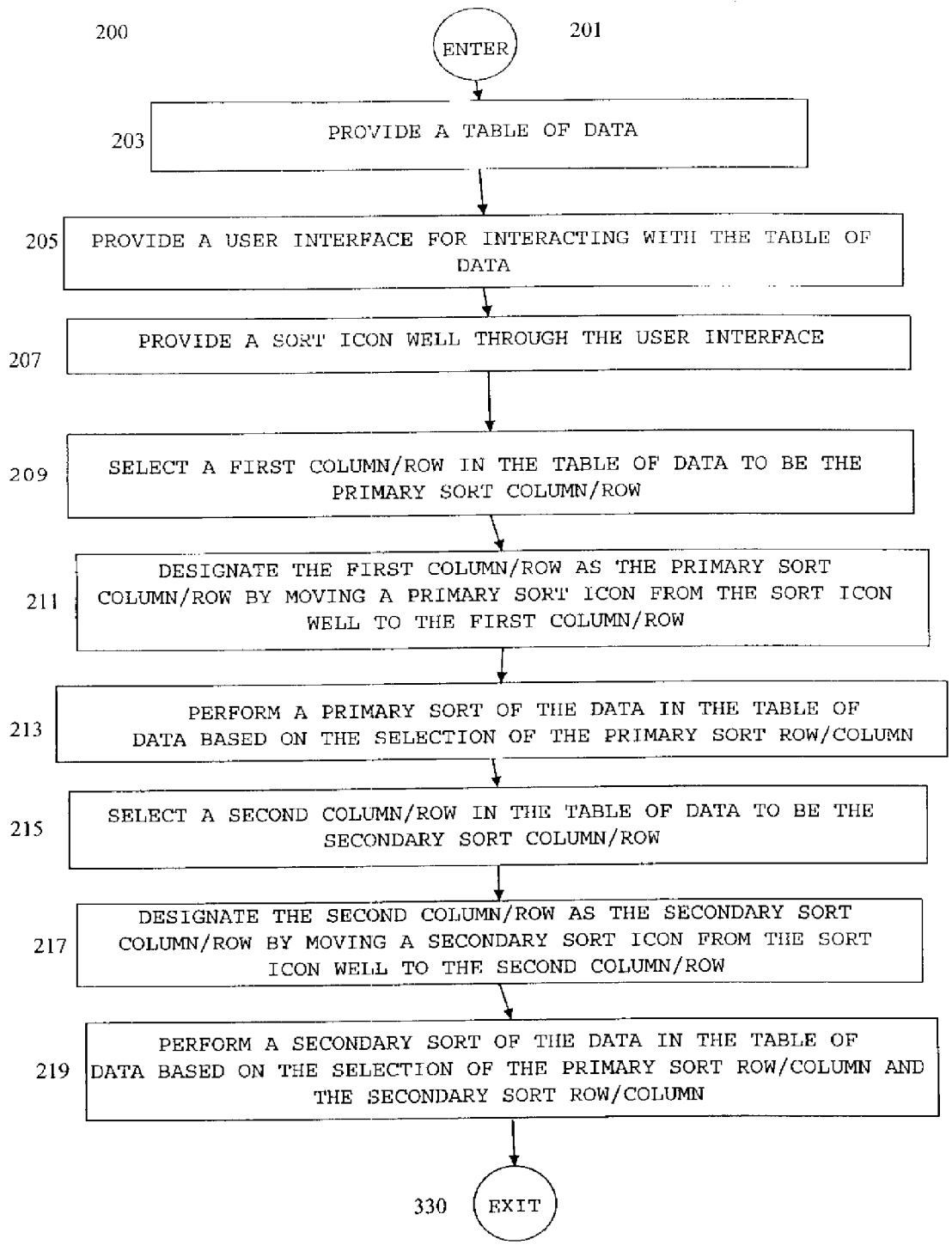
FIG. 2 is a flow chart depicting a process for multiple column/row data sorting in accordance with one embodiment.

FIG. 2 a flow chart depicting a process for multiple column/row data sorting 200 in accordance with one embodiment. Process for multiple column/row data sorting 200 begins at ENTER OPERATION 201 and process flow proceeds to PROVIDE A TABLE OF DATA OPERATION 203.

In one embodiment, at PROVIDE A TABLE OF DATA OPERATION 203 a table of data, also called a data table herein, is provided on a display screen on a display device, such display devices 115 and 125 of FIG. 1, of a computing system, such as computing system 100 or server system 120 of FIG. 1. Displaying data in data tables is well known to those of skill in the art and is an integral component of many computing system implemented programs, processes, applications, modules, and features, including, but not limited to: computing system implemented spreadsheet systems/programs; computing system implemented word processing systems/programs; computing system implemented financial management systems; web-based/web-page building systems; computing system implemented business financial systems; computing system implemented accounting programs; computing system implemented inventory systems; computing system implemented tax programs; point-of-sale programs; e-mail programs; personal time management programs; computing system implemented graphics and/or presentation systems; program development systems; and numerous other computing system implemented programs and/or systems, whether known and available at the time of filing or as developed thereafter.

A typical data table includes data arranged in columns and rows with either the columns or rows having headings indicating the subject matter/content displayed in the column or row. FIG. 3A shows one embodiment of data arranged in a data table 301. As shown in FIG. 3A, data table includes columns 321, 323, 325, and 327 and rows, such as exemplary rows 341, 343, 345, 347, and 349.

In the particular example of FIG. 3A, the data shown in data table 301 represents a listing of employees. In the particular example of FIG. 3A, column 321 includes a column heading "Last Name" and includes data representing a last name of the employees listed in the various rows. In the particular example of FIG. 3A, column 323 includes a column heading "First Name" and includes data representing a first name of the employees listed in the various rows. In the particular example of FIG. 3A, column 325 includes a column heading "DOB" and includes data representing a date of birth of the employees listed in the various rows. In the particular example of FIG. 3A, column 327 includes a column heading "DOH" and includes data representing a date of hire of the employees listed in the various rows.

Those of skill in the art will readily recognize that the choice of data presented in FIG. 3A, the method of presenting the data in FIG. 3A, and a general layout of data table 301, was chosen for illustrative purposes only and that numerous other possibilities exist for methods, layout, and data presented in a table of data, such as data table 301. In particular, in other situations, it is desirable to arrange the data with row headings, as opposed to column headings, and to generally orient data table 301 vertically, as opposed to horizontally. The use of either row headings or column headings in a table of data, such as data table 301, is well-known to those of skill in the art and is common practice.

In one embodiment, once a data table is provided at PROVIDE A TABLE OF DATA OPERATION 203, process flow proceeds to PROVIDE A USER INTERFACE FOR INTERACTING WITH THE TABLE OF DATA OPERATION 205.

In one embodiment, at PROVIDE A USER INTERFACE FOR INTERACTING WITH THE TABLE OF DATA OPERATION 205, a user interface is provided for interacting with the data table of PROVIDE A TABLE OF DATA OPERATION 203.

FIG. 3A shows user interface screen 300, including data table 301 discussed above, as it would be displayed on a display screen of a display device, such display devices 115 and 125 of FIG. 1, of a computing system, such as computing system 100 or server system 120 of FIG. 1. Returning to FIG. 3A, user interface screen 300 also includes a movable interface symbol, in this particular example, a cursor 305, for interacting with user interface screen 300 and data table 301.

In one embodiment, a movable interface symbol, such as cursor 305, is manipulated and/or controlled by any standard user interface device or mechanism including, but not limited to: a keyboard, such as keyboard 107 of FIG. 1; a mouse, such as mouse 111 of FIG. 1; a touchpad; a stylus; voice commands and/or voice recognition software; or any other means and/or mechanism for converting user actions into computing system implemented instructions for manipulating and/or controlling a movable interface symbol, such as cursor 305.

In one embodiment, the movable interface symbol, such as cursor 305 of FIG. 3A, and the user interface, such as user interface screen 300, provided at PROVIDE A USER INTERFACE FOR INTERACTING WITH THE TABLE OF DATA OPERATION 205 of FIG. 2 are used to manipulate, change, and or otherwise interact with the data presented in the table of data, such as data table 301 of FIG. 3A, of PROVIDE A TABLE OF DATA OPERATION 203 (FIG. 2).

In one embodiment, once a user interface is provided for interacting with the data table of PROVIDE A TABLE OF DATA OPERATION 203 at PROVIDE A USER INTERFACE FOR INTERACTING WITH THE TABLE OF DATA OPERATION 205 process flow proceeds to PROVIDE A SORT ICON WELL THROUGH THE USER INTERFACE OPERATION 207.

In one embodiment, at PROVIDE A SORT ICON WELL THROUGH THE USER INTERFACE OPERATION 207, a sort icon well is provided through, and/or as part of, the user interface of PROVIDE A USER INTERFACE FOR INTERACTING WITH THE TABLE OF DATA OPERATION 205. In one embodiment, the icon well includes individual sort icons each associated with an order for sorting data. As discussed in more detail below, the individual sort icons can be manipulated by a user and moved to a desired column or row to prioritize a data sort.

Returning to FIG. 3A, user interface screen 300 includes sort icon well 303 which, in this particular example, includes primary sort icon 351, secondary sort icon 352, and tertiary sort icon 353. Those of skill the art will readily recognize that the particular format and layout of sort icon well 303 shown in FIG. 3A is illustrative only and the various other formats and layouts for sort icon well would be equally applicable. In addition, while three sort icons primary sort icon 351, secondary sort icon 352, and tertiary sort icon 353 are shown in FIG. 3A in sort icon well 303, those of skill the art will readily recognize that any number of sort icons desired, including more or less than three, could be used in other embodiments and examples. Consequently, the specific example shown in FIG. 3A do not limit the scope of the invention as set forth in the claims below.

As shown in FIG. 3A, primary sort icon 351 includes a symbolic number "1" indicating that primary sort icon 351 is a primary, or first priority, sort icon. Likewise, secondary sort icon 352 includes a symbolic number "2" indicating that secondary sort icon 352 is a secondary, or second priority, sort icon. Likewise, tertiary sort icon 353 includes a symbolic number "3" indicating that tertiary sort icon 353 is a tertiary, or third priority, sort icon. Those of skill the art will readily recognize that other symbols including, but not limited to, colors, numbers, letters, or any other desired symbols could be used to indicate the priority of a given sort icon. Consequently the specific example shown in FIG. 3A does not limit the scope and the invention as set forth in the claims below.

In one embodiment, once a sort icon well is provided at PROVIDE A SORT ICON WELL THROUGH THE USER INTERFACE OPERATION 207, process flow proceeds to SELECT A FIRST COLUMN/ROW IN THE TABLE OF DATA TO BE THE PRIMARY SORT COLUMN/ROW OPERATION 209.

In one embodiment at SELECT A FIRST COLUMN/ROW IN THE TABLE OF DATA TO BE THE PRIMARY SORT COLUMN/ROW OPERATION 209 a user selects a first column, or column content, to be used as the primary sort column.

As discussed above, when viewing and/or interacting with data arranged in data tables it is often highly desirable to sort the data based on the subject matter/content in the columns and/or rows. Using process for multiple column/row data sorting 200, a user is provided with the capability to prioritize a sort using the sort icons in the sort icon well. As part of this process, a user determines which column or row the user wishes to give first, or primary, sort priority.

As discussed in more detail below, in the particular example of FIG. 3A, it will be stipulated that the user selects column 321, the "Last Name" column, as the first column or row of data table 301 that the user wishes to designate as the primary sort column. It is worth noting, that in FIG. 3A the five employees having a last name Smith in rows 341, 343, 345, 347, and 349 are dispersed throughout data table 301. This is because, in FIG. 3A, data table 301 is shown as having been sorted according to date of hire column 327.

Returning to FIG. 2, once a user has chosen a first column or row of the data table of PROVIDE A TABLE OF DATA OPERATION 203 that the user wishes to designate as the primary sort column or row at SELECT A FIRST COLUMN/ROW IN THE TABLE OF DATA TO BE THE PRIMARY SORT COLUMN/ROW OPERATION 209, process flow proceeds to DESIGNATE THE FIRST COLUMN/ROW AS THE PRIMARY SORT COLUMN/ROW BY MOVING A PRIMARY SORT ICON FROM THE SORT ICON WELL TO THE FIRST COLUMN/ROW OPERATION 211.

In one embodiment at, DESIGNATE THE FIRST COLUMN/ROW AS THE PRIMARY SORT COLUMN/ROW BY MOVING A PRIMARY SORT ICON FROM THE SORT ICON WELL TO THE FIRST COLUMN/ROW OPERATION 211, a user manipulates the primary sort icon of the icon well provided at PROVIDE A SORT ICON WELL THROUGH THE USER INTERFACE OPERATION 207 and moves the primary sort icon to a location in or near the first row or column chosen as the primary sort column or row at SELECT A FIRST COLUMN/ROW IN THE TABLE OF DATA TO BE THE PRIMARY SORT COLUMN/ROW OPERATION 209.

Figure 3B:
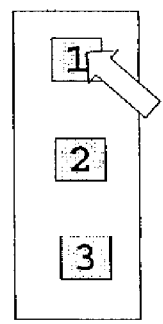
FIG. 3B shows once embodiment of a user interface screen, including a data table and sort icon well, in accordance with one embodiment.

FIG. 3B, FIG. 3C, and FIG. 3D show one example of a user manipulating the primary sort icon of the icon well provided at PROVIDE A SORT ICON WELL THROUGH THE USER INTERFACE OPERATION 207 (FIG. 2) and moving the primary sort icon to the first row or column chosen as the primary sort column or row at SELECT A FIRST COLUMN/ROW IN THE TABLE OF DATA TO BE THE PRIMARY SORT COLUMN/ROW OPERATION 209.

In particular, FIG. 3B shows user interface screen 300, data table 301, and icon well 303 with cursor 305 placed over primary icon 351. In this particular example, cursor 305 is then activated by any means well-known of those of skill in the art and/or as discussed herein, such that primary icon 351 becomes attached to cursor 305. In other embodiments cursor 305 is activated by any means well-known of those of skill in the art and/or as discussed herein, such that cursor 305 becomes the primary icon 351.

FIG. 3C shows cursor 305 with the attached primary icon 351 after being moved to the selected first column, or primary sort column, 321 with a column heading "Last Name". Those of skill in the art will recognize that in some embodiments cursor 305, with the attached primary icon 351, can be place in, on, or near, the selected first column, or primary sort column 321 to the same effect.

As discussed above, in one embodiment, a movable interface symbol, such as cursor 305, is manipulated and/or controlled by any standard user interface device or mechanism including, but not limited to: a keyboard, such as keyboard 107 of FIG. 1; a mouse, such as mouse 111 of FIG. 1; a touchpad; a stylus; voice commands and/or voice recognition software; or any other means in or mechanism for converting user actions into computing system implemented instructions for manipulating and/or controlling a movable interface symbol, such as cursor 305 of FIG. 3C.

In addition those of skill in the art will recognize that while a cursor is chosen for illustrative purposes as the movable interface symbol in FIGS. 3A to 3L, various other types of movable interface symbols could be used in other embodiments Consequently, the choice of a cursor does not limit the invention as set forth in the claims below.

In one embodiment, and in this particular example, after cursor 305 with the attached primary icon 351 is moved to the selected first column, or primary sort column, 321 with a column heading "Last Name", cursor 305 is activated by any one of numerous means known in the art, thereby attaching primary sort icon 351 to column 321 and thereby designating column 321 as the primary sort column.

Returning to FIG. 2, in one embodiment, once a user manipulates the primary sort icon of the icon well provided at PROVIDE A SORT ICON WELL THROUGH THE USER INTERFACE OPERATION 207 and moves the primary sort icon to the first row or column chosen as the primary sort column or row of SELECT A FIRST COLUMN/ROW IN THE TABLE OF DATA TO BE THE PRIMARY SORT COLUMN/ROW OPERATION 209 at DESIGNATE THE FIRST COLUMN/ROW AS THE PRIMARY SORT COLUMN/ROW BY MOVING A PRIMARY SORT ICON FROM THE SORT ICON WELL TO THE FIRST COLUMN/ROW OPERATION 211, process flow proceeds to PERFORM A PRIMARY SORT OF THE DATA IN THE TABLE OF DATA BASED ON THE SELECTION OF THE PRIMARY SORT ROW/COLUMN OPERATION 213.

In one embodiment at PERFORM A PRIMARY SORT OF THE DATA IN THE TABLE OF DATA BASED ON THE SELECTION OF THE PRIMARY SORT ROW/COLUMN OPERATION 213, the data in the data table of PROVIDE A TABLE OF DATA OPERATION 203 is sorted according to the placement of the primary sort icon of DESIGNATE THE FIRST COLUMN/ROW AS THE PRIMARY SORT COLUMN/ROW BY MOVING A PRIMARY SORT ICON FROM THE SORT ICON WELL TO THE FIRST COLUMN/ROW OPERATION 211.

FIG. 3D shows data table 301 after primary sort icon 351 has been moved from icon well 303 to column 321 thereby designating column 321 and "Last Name" as the primary sort column. In this particular example, the designation of column 321 as the primary sort column results in an automatic alphabetical listing, by last name, of the employees listed in data table 301.

As shown in FIG. 3D, since column 321 is designated as a primary sort column, all the employees are now listed, in this particular example, in descending last name alphabetical order with the employees having the last name Smith, i.e., rows 345, 349, 343, 341, and 347, grouped together in portion 360 of data table 301. Those of skill in the art will readily recognize that, in other embodiments, the order could be in ascending alphabetical order and that descending alphabetical order was chosen for illustrative purposes only and in no way limits the invention as claimed below.

It is worth noting that, as shown in FIG. 3D, while in this particular example, all the employees having a last name Smith are grouped together by virtue of the primary sort, data from column 323 regarding the employees first names has not been included as part of the primary sort. Consequently, the three John Smith's, i.e., rows 345, 343, and 347 are relatively dispersed. In many instances however it would be equally desirable to, in addition to sorting by the last name, to sort the data table by the column 323, or the first name, as well.

In one embodiment, once the data in the data table of PROVIDE A TABLE OF DATA OPERATION 203 is sorted according to the placement of the primary sort icon of DESIGNATE THE FIRST COLUMN/ROW AS THE PRIMARY SORT COLUMN/ROW BY MOVING A PRIMARY SORT ICON FROM THE SORT ICON WELL TO THE FIRST COLUMN/ROW OPERATION 211 at PERFORM A PRIMARY SORT OF THE DATA IN THE TABLE OF DATA BASED ON THE SELECTION OF THE PRIMARY SORT ROW/COLUMN OPERATION 213, process flow proceeds to SELECT A SECOND COLUMN/ROW IN THE TABLE OF DATA TO BE THE SECONDARY SORT COLUMN/ROW OPERATION 215.

In one embodiment at SELECT A SECOND COLUMN/ROW IN THE TABLE OF DATA TO BE THE SECONDARY SORT COLUMN/ROW OPERATION 215 a user selects a second column, or column content, to be used as the secondary sort column.

Once a user has chosen a second column or row of the data table of PROVIDE A TABLE OF DATA OPERATION 203 that the user wishes to designate as the secondary sort column or row at SELECT A SECOND COLUMN/ROW IN THE TABLE OF DATA TO BE THE SECONDARY SORT COLUMN/ROW OPERATION 215, process flow proceeds to DESIGNATE THE SECOND COLUMN/ROW AS THE SECONDARY SORT COLUMN/ROW BY MOVING A SECONDARY SORT ICON FROM THE SORT ICON WELL TO THE SECOND COLUMN/ROW OPERATION 217.

In one embodiment at, DESIGNATE THE SECOND COLUMN/ROW AS THE SECONDARY SORT COLUMN/ROW BY MOVING A SECONDARY SORT ICON FROM THE SORT ICON WELL TO THE SECOND COLUMN/ROW, a user manipulates the secondary sort icon of the icon well provided at PROVIDE A SORT ICON WELL THROUGH THE USER INTERFACE OPERATION 207 and moves the secondary sort icon to the second row or column chosen as the secondary sort column or row at SELECT A SECOND COLUMN/ROW IN THE TABLE OF DATA TO BE THE SECONDARY SORT COLUMN/ROW OPERATION 215 by any of the methods discussed herein.

Figure 3E:
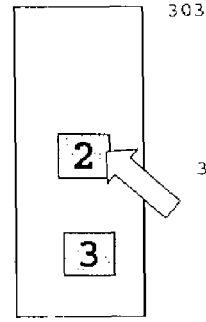
FIG. 3E shows once embodiment of a user interface screen, including a data table and sort icon well, in accordance with one embodiment.

FIG. 3E, FIG. 3F, and FIG. 3G show one example of a user manipulating the secondary sort icon 352 of the icon well 303 provided at PROVIDE A SORT ICON WELL THROUGH THE USER INTERFACE OPERATION 207 (FIG. 2) and moving the secondary sort icon to the second row or column chosen as the secondary sort column or row at SELECT A SECOND COLUMN/ROW IN THE TABLE OF DATA TO BE THE SECONDARY SORT COLUMN/ROW OPERATION 215.

In particular, FIG. 3E shows user interface screen 300, data table 301, and icon well 303 with cursor 305 placed over secondary icon 352. In this particular example, cursor 305 is then activated by any means well-known of those of skill in the art and/or as discussed herein, such that secondary icon 352 becomes attached to cursor 305. FIG. 3F shows cursor 305 with the attached secondary icon 352 after being moved to the selected second column, or secondary sort column, 323 with a column heading "First Name".

In one embodiment, and in this particular example, after cursor 305 with the attached secondary icon 352 is moved to the selected second column, or secondary sort column, 323 with a column heading "First Name", cursor 305 is activated by any one of numerous means known in the art, attaching secondary sort icon 352 to column 323 and thereby designating column 323 as the secondary sort column.

Returning to FIG. 2, in one embodiment, once a user manipulates the secondary sort icon of the icon well provided at PROVIDE A SORT ICON WELL THROUGH THE USER INTERFACE OPERATION 207 and moves the secondary sort icon to the second row or column chosen as the secondary sort column or row of SELECT A SECOND COLUMN/ROW IN THE TABLE OF DATA TO BE THE SECONDARY SORT COLUMN/ROW OPERATION 215 at DESIGNATE THE SECOND COLUMN/ROW AS THE SECONDARY SORT COLUMN/ROW BY MOVING A SECONDARY SORT ICON FROM THE SORT ICON WELL TO THE SECOND COLUMN/ROW OPERATION 217, process flow proceeds to PERFORM A SECONDARY SORT OF THE DATA IN THE TABLE OF DATA BASED ON THE SELECTION OF THE PRIMARY SORT ROW/COLUMN AND THE SECONDARY SORT ROW/COLUMN OPERATION 219.

In one embodiment at PERFORM A SECONDARY SORT OF THE DATA IN THE TABLE OF DATA BASED ON THE SELECTION OF THE PRIMARY SORT ROW/COLUMN AND THE SECONDARY SORT ROW/COLUMN OPERATION 219, the data in the data table of PROVIDE A TABLE OF DATA OPERATION 203 is sorted according to the placement of the primary sort icon of DESIGNATE THE FIRST COLUMN/ROW AS THE PRIMARY SORT COLUMN/ROW BY MOVING A PRIMARY SORT ICON FROM THE SORT ICON WELL TO THE FIRST COLUMN/ROW OPERATION 211 and the placement of the secondary sort icon of DESIGNATE THE SECOND COLUMN/ROW AS THE SECONDARY SORT COLUMN/ROW BY MOVING A SECONDARY SORT ICON FROM THE SORT ICON WELL TO THE SECOND COLUMN/ROW OPERATION 217.

FIG. 3G shows data table 301 after primary sort icon 351 has been moved from icon well 303 to column 321 and secondary sort icon 352 has been moved from icon well 303 to column 323 thereby designating column 321 and "Last Name" as the primary sort and column 323 and "First Name" as the secondary sort.

In this particular example, the designation of column 323 as the secondary sort column results in an automatic alphabetical listing, by last name and first name, of the employees listed in data table 301.

In one embodiment, the designation of column 323 as the secondary sort column is in addition to, and as a refinement of the designation of column 321 as the primary sort column. Consequently, the designation of column 323 and "First Name-" as a secondary sort column does not change the grouping of all employees having the last name Smith in section 360, however, the order of rows has changed from the non-first name alphabetical listing order of 345, 349, 343, 341, and 347 to the first name alphabetical listing order of 345, 343, 347, 349, and 341 with the employees named John Smith being grouped together. Consequently, using process for multiple column/row data sorting 200 the user is provided a capability to progressively refine a sort by multiple columns and/or data content.

It is worth noting that, as shown in FIG. 3G, while in this particular example, all the employees having the name John Smith are now grouped together by virtue of the primary and secondary sorts, data from column 325 regarding the employees date of birth has not been included as part of the sorting process. Consequently, the three John Smith's, are not listed in date of birth order.

In one embodiment the process discussed above is repeated for as many sort icons as the user desires. In this case, operations substantially identical to operations 209, 211, 213, 215, 217, and 219 are repeated for each additional sort icon.

Figure 3H:
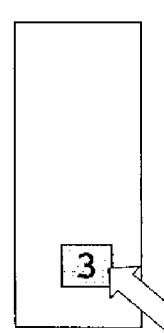
FIG. 3H shows once embodiment of a user interface screen, including a data table and sort icon well, in accordance with one embodiment.

FIGS. 3H, 3I and 3J show one example of a user manipulating the tertiary sort icon 353 of the icon well 303 provided at PROVIDE A SORT ICON WELL THROUGH THE USER INTERFACE OPERATION 207 (FIG. 2) and moving the tertiary sort icon to the third row or column chosen as the third sort column or row.

In particular, FIG. 3H shows user interface screen 300, data table 301, and icon well 303 with cursor 305 placed over tertiary icon 353. In this particular example, cursor 305 is then activated by any means well-known of those of skill in the art and/or as discussed herein, such that tertiary icon 352 becomes attached to cursor 305. FIG. 3I shows cursor 305 with the attached tertiary icon 352 after being moved to the selected third column, or tertiary sort column, 325 with a column heading "DOB" (date of birth).

In one embodiment, and in this particular example, after cursor 305 with the attached tertiary icon 353 is moved to the selected third column, or tertiary sort column, 325 with a column heading "DOB", cursor 305 is activated by any one of numerous means known in the art, thereby attaching tertiary sort icon 353 to column 325 and thereby designating column 325 as the tertiary sort column.

FIG. 3J shows data table 301 after primary sort icon 351 has been moved from icon well 303 to column 321, secondary sort icon 352 has been moved from icon well 303 to column 323, and tertiary sort icon 353 has been moved from icon well 303 to third column 325, thereby designating column 321 and "Last Name" as the primary sort, column 323 and "First Name" as the secondary sort, and third column 325 and "DOB" as the tertiary sort.

In this particular example, the designation of third column 325 as the tertiary sort column results in an automatic ascending date of birth list, by last name and first name, of the employees listed in data table 301. In one embodiment, the designation of third column 325 as the tertiary sort column is in addition to, and as a refinement of, the designation of column 321 as the primary sort column and the designation of column 323 are the secondary sort. Consequently, the designation of third column 325 and "DOB" as a tertiary sort column does not change the grouping of all employees having the name John Smith together, however, the order of rows has changed from 345, 343, and 347 to 345, 347 and 343, reflecting the ascending birth dates. Consequently, using process for multiple column/row data sorting 200 the user is provided a capability to progressively refine a sort by multiple columns and/or data content.

In addition, in one embodiment, sort icons can be exchanged between columns and rows to view the data in the data table in various arrangements. In some embodiments, sort icons can be exchanged between columns and rows by moving one or more of the sort icons involved back into the sort icon well and then repositioning the icons as desired. In other embodiments, more direct exchanges of sort icons are facilitated through direct switching of icons and then activating the icons and/or refreshing/updating the data display.

FIG. 3K shows user interface screen 300 and data table 301 after a user has exchanged secondary sort icon 352 for tertiary sort icon 353 in column 323 and tertiary sort icon 353 for secondary sort icon 352 in column 325, i.e., column 523 and 325 have exchanged sort icons. As a result of this exchange the employees of the last name Smith are now listed in FIG. 3K by ascending birth date as the secondary sort, without regard for the grouping of all the employees named John Smith together.

In one embodiment, once the data in the data table of PROVIDE A TABLE OF DATA OPERATION 203 is sorted according to the placement of the primary sort icon of DESIGNATE THE FIRST COLUMN/ROW AS THE PRIMARY SORT COLUMN/ROW BY MOVING A PRIMARY SORT ICON FROM THE SORT ICON WELL TO THE FIRST COLUMN/ROW OPERATION 211 and the secondary sort icon of DESIGNATE THE SECOND COLUMN/ROW AS THE SECONDARY SORT COLUMN/ROW BY MOVING A SECONDARY SORT ICON FROM THE SORT ICON WELL TO THE SECOND COLUMN/ROW OPERATION 217, and any other desired/used sort icons, at PERFORM A SECONDARY SORT OF THE DATA IN THE TABLE OF DATA BASED ON THE SELECTION OF THE PRIMARY SORT ROW/COLUMN AND THE SECONDARY SORT ROW/COLUMN OPERATION 219, process flow proceeds to Exit operation 330 and process for multiple column/row data sorting 200 is exited.

In accordance with one embodiment, a process for multiple column/row data sorting includes a movable interface symbol, such as a cursor, as part of a user interface for interacting with data arranged a data table. In one embodiment, the performance of designated key or command sequences through a user interface device transforms the movable interface symbol into a movable sort symbol.

Figure 4:
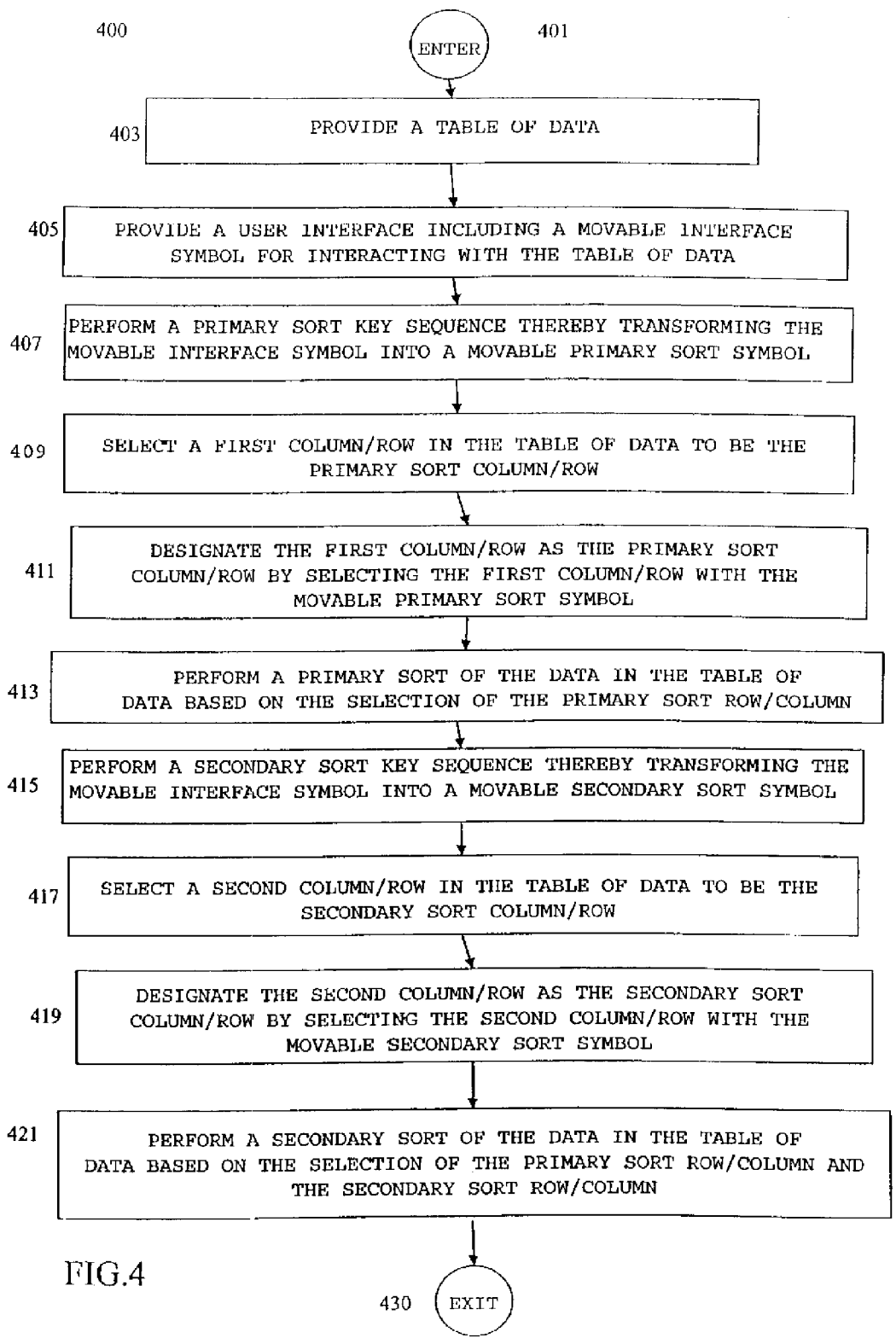
FIG. 4 is a flow chart depicting a process for multiple column/row data sorting in accordance with one embodiment.

FIG. 4 a flow chart depicting a process for multiple column/row data sorting 400 in accordance with one embodiment. Process for multiple column/row data sorting 400 begins at ENTER OPERATION 401 and process flow proceeds to PROVIDE A TABLE OF DATA OPERATION 403.

In one embodiment, at PROVIDE A TABLE OF DATA OPERATION 403 a table of data, also called a data table herein, is provided on a display screen on a display device, such display devices 115 and 125 of FIG. 1, of a computing system, such as computing system 100 or server system 120 of FIG. 1.

As discussed above, a typical data table includes data arranged in columns and rows with either the columns or rows having headings indicating the subject matter/content displayed in the column or row. FIG. 5A shows one embodiment of data arranged in a data table 501. As shown in FIG. 5A, data table 501 includes columns 521, 523, 525, and 527 and rows, such as exemplary rows 541, 543, 545, 547, and 549.

In the particular example of FIG. 5A, the data shown in data table 501 represents a listing of employees. In the particular example of FIG. 5A, column 521 includes a column heading "Last Name" and includes data representing a last name of the employees listed in the various rows. In the particular example of FIG. 5A, column 523 includes a column heading "First Name" and includes data representing a first name of the employees listed in the various rows. In the particular example of FIG. 5A, column 525 includes a column heading "DOB" and includes data representing a date of birth of the employees listed in the various rows. In the particular example of FIG. 5A, column 527 includes a column heading "DOH" and includes data representing a date of hire of the employees listed in the various rows.

Those of skill in the art will readily recognize that the choice of data presented in FIG. 5A, the method of presenting the data in FIG. 5A, and a general layout of data table 501, was chosen for illustrative purposes only and that numerous other possibilities exist for methods, layout, and data presented in a table of data, such as data table 501. In particular, in other situations, it is desirable to arrange the data with row headings, as opposed to column headings, and to generally orient data table 501 vertically, as opposed to horizontally. The use of either row headings or column headings in a table of data, such as data table 501, is well-known to those of skill in the art and is common practice.

In one embodiment, once a data table is provided at PROVIDE A TABLE OF DATA OPERATION 403, process flow proceeds to PROVIDE A USER INTERFACE INCLUDING A MOVABLE INTERFACE SYMBOL FOR INTERACTING WITH THE TABLE OF DATA OPERATION 405.

In one embodiment, at PROVIDE A USER INTERFACE INCLUDING A MOVABLE INTERFACE SYMBOL FOR INTERACTING WITH THE TABLE OF DATA OPERATION 405, a user interface is provided for interacting with the data table of PROVIDE A TABLE OF DATA OPERATION 403.

FIG. 5A shows user interface screen 500, including data table 501 discussed above, as it would be displayed on a display screen of a display device, such display devices 115 and 125 of FIG. 1, of a computing system, such as computing system 100 or server system 120 of FIG. 1. Returning to FIG. 5A, user interface screen 500 also includes a movable interface symbol, in this particular example, a cursor 505, for interacting with user interface screen 500 and data table 501.

In one embodiment, a movable interface symbol, such as cursor 505, is manipulated and/or controlled by any standard user interface device or mechanism including, but not limited to, those discussed herein.

In one embodiment, the movable interface symbol, such as cursor 505 of FIG. 5A, and the user interface, such as user interface screen 500, provided at PROVIDE A USER INTERFACE INCLUDING A MOVABLE INTERFACE SYMBOL FOR INTERACTING WITH THE TABLE OF DATA OPERATION 405 of FIG. 4 are used to manipulate, change, and or otherwise interact with the data presented in the table of data, such as data table 501 of FIG. 5A, of PROVIDE A TABLE OF DATA OPERATION 403 (FIG. 4).

In one embodiment, once a user interface is provided for interacting with the data table of PROVIDE A TABLE OF DATA OPERATION 403 at PROVIDE A USER INTERFACE INCLUDING A MOVABLE INTERFACE SYMBOL FOR INTERACTING WITH THE TABLE OF DATA OPERATION 405 process flow proceeds to PERFORM A PRIMARY SORT KEY SEQUENCE THEREBY TRANSFORMING THE MOVABLE INTERFACE SYMBOL INTO A MOVABLE PRIMARY SORT SYMBOL OPERATION 407.

In one embodiment, at PERFORM A PRIMARY SORT KEY SEQUENCE THEREBY TRANSFORMING THE MOVABLE INTERFACE SYMBOL INTO A MOVABLE PRIMARY SORT SYMBOL OPERATION 407, a designated key sequence is performed by the user that transforms the movable interface symbol, such as a cursor, into a movable primary sort symbol.

In one embodiment, the designated primary sort key sequence includes the pressing and/or holding down of multiple keys, such as, for example, a function key in combination with the number one or, in another example, the control key combined with the alternate key and the number one. Those of skill in the art will readily recognize that numerous key sequence designations can be used to transform the movable interface symbol into a movable primary sort symbol. In one embodiment the performance of the designated primary sort key sequence while the movable interface symbol is within a given column automatically designates that column as the primary sort column. In one embodiment, the graphic display of the movable interface symbol is transformed into a graphical display of a movable primary sort symbol and then the movable primary sort symbol is positioned in a desired column, or column header, and action is taken to activate the movable primary sort symbol.

FIG. 5B shows user interface display 500 and data table 501 including movable primary sort symbol 507, as transformed from movable user interface symbol 505 of FIG. 5A by performing the primary sort key sequence of PERFORM A PRIMARY SORT KEY SEQUENCE THEREBY TRANSFORMING THE MOVABLE INTERFACE SYMBOL INTO A MOVABLE PRIMARY SORT SYMBOL OPERATION 407.

In one embodiment, once a designated key sequence is performed by the user that transforms the movable interface symbol, such as a cursor, into a movable primary sort symbol at PERFORM A PRIMARY SORT KEY SEQUENCE THEREBY TRANSFORMING THE MOVABLE INTERFACE SYMBOL INTO A MOVABLE PRIMARY SORT SYMBOL OPERATION 407, process flow proceeds to SELECT A FIRST COLUMN/ROW IN THE TABLE OF DATA TO BE THE PRIMARY SORT COLUMN/ROW OPERATION 409.

In one embodiment at SELECT A FIRST COLUMN/ROW IN THE TABLE OF DATA TO BE THE PRIMARY SORT COLUMN/ROW OPERATION 409 a user selects a first column, or column content, to be used as the primary sort column.

As discussed above, when viewing and/or interacting with data arranged in data tables it is often highly desirable to sort the data based on the subject matter/content in the columns and/or rows. Using process for multiple column/row data sorting 400, a user is provided with the capability to prioritize a sort using the movable user interface symbol/movable primary sort symbol. As part of this process, a user determines which column or row the user wishes to give first, or primary, sort priority.

As discussed in more detail below, in the particular example of FIG. 5A, it will be stipulated that the user selects column 521, the "Last Name" column, as the first column or row of data table 501 that the user wishes to designate as the primary sort column. It is worth noting that in FIG. 5A the five employees having a last name Smith in rows 541, 543, 545, 547, and 549 are dispersed throughout data table 501. This is because, in FIG. 5A, data table 501 is shown as having been sorted according to date of hire column 527.

Returning to FIG. 4, once a user has chosen a first column or row of the data table of PROVIDE A TABLE OF DATA OPERATION 403 that the user wishes to designate as the primary sort column or row at SELECT A FIRST COLUMN/ROW IN THE TABLE OF DATA TO BE THE PRIMARY SORT COLUMN/ROW OPERATION 409, process flow proceeds to DESIGNATE THE FIRST COLUMN/ROW AS THE PRIMARY SORT COLUMN/ROW BY SELECTING THE FIRST COLUMN/ROW WITH THE MOVABLE PRIMARY SORT SYMBOL OPERATION 411.

In one embodiment at, DESIGNATE THE FIRST COLUMN/ROW AS THE PRIMARY SORT COLUMN/ROW BY SELECTING THE FIRST COLUMN/ROW WITH THE MOVABLE PRIMARY SORT SYMBOL OPERATION 411, a user manipulates the movable user interface symbol/movable primary sort symbol provided at PERFORM A PRIMARY SORT KEY SEQUENCE THEREBY TRANSFORMING THE MOVABLE INTERFACE SYMBOL INTO A MOVABLE PRIMARY SORT SYMBOL OPERATION 407 and moves the movable primary sort symbol to the first row or column chosen as the primary sort column or row at SELECT A FIRST COLUMN/ROW IN THE TABLE OF DATA TO BE THE PRIMARY SORT COLUMN/ROW OPERATION 409.

Figure 5D:
FIG. 5D shows once embodiment of a user interface screen, including a data table and movable interface/sort symbol, in accordance with one embodiment.

FIG. 5B, FIG. 5C, and FIG. 5D show one example of a user manipulating the movable user interface symbol/movable primary sort symbol provided at PERFORM A PRIMARY SORT KEY SEQUENCE THEREBY TRANSFORMING THE MOVABLE INTERFACE SYMBOL INTO A MOVABLE PRIMARY SORT SYMBOL OPERATION 407 (FIG. 4) and moving the movable primary sort symbol to the first row or column chosen as the primary sort column or row at SELECT A FIRST COLUMN/ROW IN THE TABLE OF DATA TO BE THE PRIMARY SORT COLUMN/ROW OPERATION 409.

In particular, FIG. 5B shows user interface screen 500, data table 501, and movable primary sort symbol 507, as transformed from movable user interface symbol 505 of FIG. 5A or by performing the primary sort key sequence of PERFORM A PRIMARY SORT KEY SEQUENCE THEREBY TRANSFORMING THE MOVABLE INTERFACE SYMBOL INTO A MOVABLE PRIMARY SORT SYMBOL OPERATION 407. FIG. 5C shows movable primary sort symbol after being moved to the selected first column, or primary sort column, 521 with a column heading "Last Name".

As discussed above, in one embodiment, a movable interface symbol, such as cursor 505 or movable primary sort symbol 507, is manipulated and/or controlled by any standard user interface device or mechanism including, but not limited to, those discussed herein.

In addition those of skill in the art will recognize that while a cursor and/or a graphical number block were chosen for illustrative purposes as the movable interface symbol and movable primary sort symbol in FIGS. 5A to 5G, various other types of movable interface symbols could be used in other embodiments. Consequently, the choice of a cursor and/or a graphical number block does not limit the invention as set forth in the claims below.

In one embodiment, and in this particular example, after movable primary sort symbol 507 is moved to the selected primary sort column 521 with a column heading "Last Name", movable primary sort symbol 507 is activated by any one of numerous means known in the art, thereby attaching movable primary sort symbol 507 to column 521 and thereby designating column 521 as the primary sort column.

Returning to FIG. 4, in one embodiment, once a user manipulates the movable user interface symbol/movable primary sort symbol provided at PERFORM A PRIMARY SORT KEY SEQUENCE THEREBY TRANSFORMING THE MOVABLE INTERFACE SYMBOL INTO A MOVABLE PRIMARY SORT SYMBOL OPERATION 407 and moves the movable primary sort symbol to the first row or column chosen as the primary sort column or row of SELECT A FIRST COLUMN/ROW IN THE TABLE OF DATA TO BE THE PRIMARY SORT COLUMN/ROW OPERATION 409 at DESIGNATE THE FIRST COLUMN/ROW AS THE PRIMARY SORT COLUMN/ROW BY SELECTING THE FIRST COLUMN/ROW WITH THE MOVABLE PRIMARY SORT SYMBOL OPERATION 411, process flow proceeds to PERFORM A PRIMARY SORT OF THE DATA IN THE TABLE OF DATA BASED ON THE SELECTION OF THE PRIMARY SORT ROW/COLUMN OPERATION 413.

In one embodiment at PERFORM A PRIMARY SORT OF THE DATA IN THE TABLE OF DATA BASED ON THE SELECTION OF THE PRIMARY SORT ROW/COLUMN OPERATION 413, the data in the data table of PROVIDE A TABLE OF DATA OPERATION 403 is sorted according to the placement of the movable primary sort symbol of DESIGNATE THE FIRST COLUMN/ROW AS THE PRIMARY SORT COLUMN/ROW BY SELECTING THE FIRST COLUMN/ROW WITH THE MOVABLE PRIMARY SORT SYMBOL OPERATION 411.

FIG. 5D shows data table 501 after movable primary sort symbol 507 has been activated and primary sort status has been accorded to column 521 thereby designating column 521 and "Last Name" as the primary sort column. In this particular example, the designation of column 521 as the primary sort column results in an automatic alphabetical listing, by last name, of the employees listed in data table 501.

As shown in FIG. 5D, since column 521 is designated as a primary sort column, all the employees are now listed, in this particular example, in descending last name alphabetical order with the employees having the last name Smith, i.e., rows 545, 549, 543, 541, and 547, grouped together in data table 501. Those of skill in the art will readily recognize that, in other embodiments, the order could be in ascending alphabetical order and that descending alphabetical order was chosen for illustrative purposes only and in no way limits the invention as claimed below.

Also shown in FIG. 5D is cursor 505, as restored after movable primary sort symbol 507 has been activated and primary sort status has been accorded to column 521.

It is worth noting that, as shown in FIG. 5D, while in this particular example, all the employees having a last name Smith are grouped together by virtue of the primary sort, data from column 523 regarding the employees first names has not been included as part of the primary sort. Consequently, the three John Smith's, i.e., rows 545, 543, and 547 are relatively dispersed. In many instances however it would be equally desirable, in addition to sorting by the last name, to sort the data table by column 523, or the first name, as well.

In one embodiment, once the data in the data table of PROVIDE A TABLE OF DATA OPERATION 403 is sorted according to the placement of the movable primary sort symbol of DESIGNATE THE FIRST COLUMN/ROW AS THE PRIMARY SORT COLUMN/ROW BY SELECTING THE FIRST COLUMN/ROW WITH THE MOVABLE PRIMARY SORT SYMBOL OPERATION 411 at PERFORM A PRIMARY SORT OF THE DATA IN THE TABLE OF DATA BASED ON THE SELECTION OF THE PRIMARY SORT ROW/COLUMN OPERATION 413, process flow proceeds to PERFORM A SECONDARY SORT KEY SEQUENCE THEREBY TRANSFORMING THE MOVABLE INTERFACE SYMBOL INTO A MOVABLE SECONDARY SORT SYMBOL OPERATION 415.

In one embodiment, at PERFORM A SECONDARY SORT KEY SEQUENCE THEREBY TRANSFORMING THE MOVABLE INTERFACE SYMBOL INTO A MOVABLE SECONDARY SORT SYMBOL OPERATION 415, a designated key sequence is performed by the user that transforms the movable interface symbol, such as a cursor, into a movable secondary sort symbol.

In one embodiment, the designated secondary sort key sequence includes the pressing and/or holding down of multiple keys, such as, for example, a function key in combination with the number two or, in another example, the control key combined with the alternate key and the number two. Those of skill in the art will readily recognize that numerous key sequence designations can be used to transform the movable interface symbol into a movable secondary sort symbol. In one embodiment the performance of the designated secondary sort key sequence while the movable interface symbol is within a given column automatically designates that column as the secondary sort column. In one embodiment, the graphic display of the movable interface symbol is transformed into a graphical display of a movable secondary sort symbol and then the movable secondary sort symbol is positioned in a desired column or column header. Then action is taken to activate the movable secondary sort symbol.

FIG. 5E shows user interface display 500 and data table 501 including movable secondary sort symbol 509, as transformed from movable user interface symbol 505 of FIG. 5A or FIG. 5D by performing the secondary sort key sequence of PERFORM A SECONDARY SORT KEY SEQUENCE THEREBY TRANSFORMING THE MOVABLE INTERFACE SYMBOL INTO A MOVABLE SECONDARY SORT SYMBOL OPERATION 415.

In one embodiment, once a designated secondary key sequence is performed by the user that transforms the movable interface symbol, such as a cursor, into a movable secondary sort symbol at PERFORM A SECONDARY SORT KEY SEQUENCE THEREBY TRANSFORMING THE MOVABLE INTERFACE SYMBOL INTO A MOVABLE SECONDARY SORT SYMBOL OPERATION 415, process flow proceeds to SELECT A SECOND COLUMN/ROW IN THE TABLE OF DATA TO BE THE SECONDARY SORT COLUMN/ROW OPERATION 417.

In one embodiment at SELECT A SECOND COLUMN/ROW IN THE TABLE OF DATA TO BE THE SECONDARY SORT COLUMN/ROW OPERATION 417 a user selects a second column, or column content, to be used as the secondary sort column.

Once a user has chosen a second column or row of the data table of PROVIDE A TABLE OF DATA OPERATION 403 that the user wishes to designate as the secondary sort column or row at SELECT A SECOND COLUMN/ROW IN THE TABLE OF DATA TO BE THE SECONDARY SORT COLUMN/ROW OPERATION 417, process flow proceeds to DESIGNATE THE SECOND COLUMN/ROW AS THE SECONDARY SORT COLUMN/ROW BY SELECTING THE SECOND COLUMN/ROW WITH THE MOVABLE SECONDARY SORT SYMBOL OPERATION 419.

In one embodiment at DESIGNATE THE SECOND COLUMN/ROW AS THE SECONDARY SORT COLUMN/ROW BY MOVING A SECONDARY SORT ICON FROM THE SORT ICON WELL TO THE SECOND COLUMN/ROW, a user manipulates the movable user interface symbol/movable secondary sort symbol provided at PERFORM A SECONDARY SORT KEY SEQUENCE THEREBY TRANSFORMING THE MOVABLE INTERFACE SYMBOL INTO A MOVABLE SECONDARY SORT SYMBOL OPERATION 415 and moves the movable secondary sort symbol to the second row or column chosen as the secondary sort column or row at SELECT A SECOND COLUMN/ROW IN THE TABLE OF DATA TO BE THE SECONDARY SORT COLUMN/ROW OPERATION 417 by any of the methods discussed herein.

Figure 5G:
FIG. 5G shows once embodiment of an interface screen, including a data table and movable interface/sort symbol, in accordance with one embodiment.

FIG. 5E, FIG. 5F, and FIG. 5G show one example of a user manipulating the movable user interface symbol/movable secondary sort symbol provided at PERFORM A SECONDARY SORT KEY SEQUENCE THEREBY TRANSFORMING THE MOVABLE INTERFACE SYMBOL INTO A MOVABLE SECONDARY SORT SYMBOL OPERATION 415 (FIG. 4) and moving the movable secondary sort symbol to the second row or column chosen as the secondary sort column or row at SELECT A SECOND COLUMN/ROW IN THE TABLE OF DATA TO BE THE SECONDARY SORT COLUMN/ROW OPERATION 417.

In particular, FIG. 5E shows user interface screen 500, data table 501, and movable secondary sort symbol 509. FIG. 5C shows movable secondary sort symbol 509 after being moved to the selected second column, or secondary sort column, 523 with a column heading "First Name".

In one embodiment, and in this particular example, after movable secondary sort symbol 509 is moved to the selected secondary sort column 523 with a column heading "First Name", and movable secondary sort symbol 509 is then activated by any one of numerous means known in the art, thereby attaching movable secondary sort symbol 509 to column 523 and thereby designating column 523 as the secondary sort column.

Returning to FIG. 4, in one embodiment, once a user manipulates the movable secondary sort symbol provided at PERFORM A PRIMARY SORT KEY SEQUENCE THEREBY TRANSFORMING THE MOVABLE INTERFACE SYMBOL INTO A MOVABLE PRIMARY SORT SYMBOL OPERATION 407 and moves the movable secondary sort symbol to the second row or column chosen as the secondary sort column or row of PERFORM A SECONDARY SORT KEY SEQUENCE THEREBY TRANSFORMING THE MOVABLE INTERFACE SYMBOL INTO A MOVABLE SECONDARY SORT SYMBOL OPERATION 415 at DESIGNATE THE SECOND COLUMN/ROW AS THE SECONDARY SORT COLUMN/ROW BY SELECTING THE SECOND COLUMN/ROW WITH THE MOVABLE SECONDARY SORT SYMBOL OPERATION 419, process flow proceeds to PERFORM A SECONDARY SORT OF THE DATA IN THE TABLE OF DATA BASED ON THE SELECTION OF THE PRIMARY SORT ROW/COLUMN AND THE SECONDARY SORT ROW/COLUMN OPERATION 421.

In one embodiment at PERFORM A SECONDARY SORT OF THE DATA IN THE TABLE OF DATA BASED ON THE SELECTION OF THE PRIMARY SORT ROW/COLUMN AND THE SECONDARY SORT ROW/COLUMN OPERATION 421, the data in the data table of PROVIDE A TABLE OF DATA OPERATION 403 is sorted according to the placement of the movable primary sort symbol of DESIGNATE THE FIRST COLUMN/ROW AS THE PRIMARY SORT COLUMN/ROW BY SELECTING THE FIRST COLUMN/ROW WITH THE MOVABLE PRIMARY SORT SYMBOL OPERATION 411 and the placement of the movable secondary sort symbol of DESIGNATE THE SECOND COLUMN/ROW AS THE SECONDARY SORT COLUMN/ROW BY SELECTING THE SECOND COLUMN/ROW WITH THE MOVABLE SECONDARY SORT SYMBOL OPERATION 419.

FIG. 5G shows data table 501 after movable primary sort symbol 507 has been moved to column 521 and movable secondary sort symbol 509 has been moved to column 523 thereby designating column 521 and "Last Name" as the primary sort and column 523 and "First Name" as the secondary sort.

In this particular example, the designation of column 523 as the secondary sort column results in an automatic alphabetical listing, by last name and first name, of the employees listed in data table 501.

In one embodiment, the designation of column 523 as the secondary sort column is in addition to, and as a refinement of, the designation of column 521 as the primary sort column. Consequently, the designation of column 523 and "First Name" as a secondary sort column does not change the grouping of all employees having the last name Smith, however, the order of rows has changed from the non-first name alphabetical listing order of 545, 549, 543, 541, and 547 to the first name alphabetical listing order of 545, 543, 547, 549, and 541 with the employees named John Smith being grouped together. Consequently, using process for multiple column/row data sorting 400 the user is provided a capability to progressively refine a sort by multiple columns and/or data content.

Also shown in FIG. 5G is cursor 505, as restored after movable secondary sort symbol 509 has been activated and secondary sort status has been accorded to column 523.

In one embodiment the process discussed above is repeated for as many sorts as the user desires. In this case, operations substantially identical to operations 515, 517, 519, and 521 are repeated for each additional sort.

In one embodiment, once the data in the data table of PROVIDE A TABLE OF DATA OPERATION 403 is sorted according to the placement of the movable primary sort symbol of DESIGNATE THE FIRST COLUMN/ROW AS THE PRIMARY SORT COLUMN/ROW BY SELECTING THE FIRST COLUMN/ROW WITH THE MOVABLE PRIMARY SORT SYMBOL OPERATION 411 and the movable secondary sort symbol of DESIGNATE THE SECOND COLUMN/ROW AS THE SECONDARY SORT COLUMN/ROW BY SELECTING THE SECOND COLUMN/ROW WITH THE MOVABLE SECONDARY SORT SYMBOL OPERATION 419, and any other desired sorts, at PERFORM A SECONDARY SORT OF THE DATA IN THE TABLE OF DATA BASED ON THE SELECTION OF THE PRIMARY SORT ROW/COLUMN AND THE SECONDARY SORT ROW/COLUMN OPERATION 421, process flow proceeds to Exit operation 430 and process for multiple column/row data sorting 400 is exited.

Using the method and system for multiple column/row data sorting, and processes for multiple column/row data sorting 200 and 400, disclosed herein, a user is provided with the capability to sort data arranged in data tables by multiple columns or rows simultaneously and in a progressively refined manner. In addition, using the method and system for multiple column/row data sorting, and processes for multiple column/row data sorting, disclosed herein, the user is provided the capability to prioritize the sorting of the data by multiple columns/rows using a simple and visually intuitive user interface.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "performing", "selecting", "designating", "storing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In addition, the operations shown in the FIG.s are shown as being performed in a particular order for ease of description and understanding. However, other orders of operations are possible and the specific order of operations shown in the FIG.s and discussed above does not limit the invention as claimed below.

Therefore, numerous variations, whether explicitly provided for by the specification or implied by the specification or not, may be implemented by one of skill in the art in view of this disclosure.

What is claimed is:

1. A computing system implemented process for multiple column data sorting comprising:
   a computing system; and
   at least one processor associated with the computing, the at least one processor executing instructions for implementing at least part of a computing system implemented process for multiple column data sorting, the computing system implemented process for multiple column data sorting including:
   providing a table of data comprising data arranged in columns and rows;
   providing a user interface for interacting with the table of data;
   providing a sort icon well, the sort icon well comprising two or more positionable sort icons;
   selecting a first column of the table of data to be a primary sort column;
   moving a first positionable sort icon from the sort icon well to the first column, thereby designating the first column as a primary sort column;
   performing a primary sort of the data in the table of data based on the designated primary sort column;
   selecting a second column of the table of data to be a secondary sort column;
   moving a second positionable sort icon from the sort icon well to the second column, thereby designating the second column as a secondary sort column;
   performing a secondary sort of the data in the table of data based on the designated primary sort column and the designated secondary sort column.

2. The computing system implemented process for multiple column data sorting of claim 1, wherein;
   moving a first positionable sort icon from the sort icon well to the first column, thereby designating the first column as a primary sort column, comprises dragging and dropping the first positionable sort icon using a movable interface symbol; and
   moving a second positionable sort icon from the sort icon well to the second column, thereby designating the second column as a secondary sort column, comprises dragging and dropping the second positionable sort icon using the movable interface symbol.

3. The computing system implemented process for multiple column data sorting of claim 1, wherein;
   the first positionable sort icon is a visually designated primary positionable sort icon; and
   the second positionable sort icon is a visually designated positionable secondary sort icon.

4. A computing system implemented process for multiple row data sorting comprising:
   a computing system; and
   at least one processor associated with the computing, the at least one processor executing instructions for implementing at least part of a computing system implemented process for multiple column data sorting, the computing system implemented process for multiple column data sorting including:
   providing a table of data comprising data arranged in rows and columns;
   providing a user interface for interacting with the table of data;
   providing a sort icon well, the sort icon well comprising two or more positionable sort icons;
   selecting a first row of the table of data to be a primary sort row;
   moving a first positionable sort icon from the sort icon well to the first row, thereby designating the first row as a primary sort row;
   performing a primary sort of the data in the table of data based on the designated primary sort row;
   selecting a second row of the table of data to be a secondary sort row;
   moving a second positionable sort icon from the sort icon well to the second row, thereby designating the second row as a secondary sort row;
   performing a secondary sort of the data in the table of data based on the designated primary sort row and the designated secondary sort row.

5. The computing system implemented process for multiple row data sorting of claim 4, wherein;
   moving a first positionable sort icon from the sort icon well to the first row, thereby designating the first row as a primary sort row, comprises dragging and dropping the first positionable sort icon using a movable interface symbol; and
   moving a second positionable sort icon from the sort icon well to the second row, thereby designating the second row as a secondary sort row, comprises dragging and dropping the second positionable sort icon using the movable interface symbol.

6. The computing system implemented process for multiple column data sorting of claim 4, wherein;
   the first positionable sort icon is a visually designated primary sort icon; and
   the second positionable sort icon is a visually designated secondary sort icon.

7. A computing system implemented process for multiple column data sorting comprising:
   a computing system; and
   at least one processor associated with the computing, the at least one processor executing instructions for implementing at least part of a computing system implemented process for multiple column data sorting, the computing system implemented process for multiple column data sorting including:
   providing a table of data comprising data arranged in columns and rows;

providing a user interface for interacting with the table of data;
providing a movable interface symbol through the user interface;
performing a defined primary sort action, thereby transforming the movable interface symbol into a movable primary sort symbol;
selecting a first column of the table of data to be a primary sort column;
moving the movable primary sort symbol to the first column;
activating the movable primary sort symbol, thereby designating the first column as a primary sort column;
performing a primary sort of the data in the table of data based on the designated primary sort column;
performing a defined secondary sort action, thereby transforming the movable interface symbol into a movable secondary sort symbol;
selecting a second column of the table of data to be a secondary sort column;
moving the movable secondary sort symbol to the second column;
activating the movable secondary sort symbol, thereby designating the second column as a secondary sort column;
performing a secondary sort of the data in the table of data based on the designated primary sort column and the designated secondary sort column.

8. The computing system implemented process for multiple column data sorting of claim 7, wherein;
the movable interface symbol is a cursor controlled by a user interface device.

9. The computing system implemented process for multiple column data sorting of claim 7, wherein;
the movable interface symbol is controlled by at least one user interface device and activating the movable primary sort symbol and activating the movable secondary sort symbol is performed through at least one user interface device.

10. The computing system implemented process for multiple column data sorting of claim 7, wherein;
the movable primary sort symbol is a visually designated movable primary sort symbol; and
the movable secondary sort symbol is a visually designated movable secondary sort symbol.

11. A computing system implemented process for multiple row data sorting comprising:
a computing system; and
at least one processor associated with the computing, the at least one processor executing instructions for implementing at least part of a computing system implemented process for multiple column data sorting, the computing system implemented process for multiple column data sorting including:
providing a table of data comprising data arranged in rows and columns;
providing a user interface for interacting with the table of data;
providing a movable interface symbol through the user interface;
performing a defined primary sort action, thereby transforming the movable interface symbol into a movable primary sort symbol;
selecting a first row of the table of data to be a primary sort row;
moving the movable primary sort symbol to the first row;
activating the movable primary sort symbol, thereby designating the first row as a primary sort row;
performing a primary sort of the data in the table of data based on the designated primary sort row;
performing a defined secondary sort action, thereby transforming the movable interface symbol into a movable secondary sort symbol;
selecting a second row of the table of data to be a secondary sort row;
moving the movable secondary sort symbol to the second row;
activating the movable secondary sort symbol, thereby designating the second row as a secondary sort row;
performing a secondary sort of the data in the table of data based on the designated primary sort row and the designated secondary sort row.

12. The computing system implemented process for multiple row data sorting of claim 11, wherein;
the movable interface symbol is a cursor controlled by a user interface device.

13. The computing system implemented process for multiple row data sorting of claim 11, wherein;
the movable interface symbol is controlled by at least one user interface device and activating the movable primary sort symbol and activating the movable secondary sort symbol is performed through at least one user interface device.

14. The computing system implemented process for multiple row data sorting of claim 11, wherein;
the movable primary sort symbol is a visually designated movable primary sort symbol; and
the movable secondary sort symbol is a visually designated movable secondary sort symbol.

15. A computer program product for providing a process for multiple column data sorting comprising:
a computer readable medium;
and computer program code, encoded on the computer readable medium, comprising computer readable instructions for:
providing a user interface for interacting with a table of data, the table of data comprising data arranged in columns and rows;
providing a sort icon well, the sort icon well comprising two or more positionable sort icons;
selecting a first column of the table of data to be a primary sort column;
enabling a user to move a first positionable sort icon from the sort icon well to the first column, thereby designating the first column as a primary sort column;
performing a primary sort of the data in the table of data based on the designated primary sort column;
selecting a second column of the table of data to be a secondary sort column;
enabling a user to move a second positionable sort icon from the sort icon well to the second column, thereby designating the second column as a secondary sort column;
performing a secondary sort of the data in the table of data based on the designated primary sort column and the designated secondary sort column.

16. The computer program product for providing a process for multiple column data sorting of claim 15, wherein;
enabling a user to move a first positionable sort icon from the sort icon well to the first column, thereby designating the first column as a primary sort column, comprises dragging and dropping the first positionable sort icon using a movable interface symbol; and
enabling a user to move a second positionable sort icon from the sort icon well to the second column, thereby designating the second column as a secondary sort column, comprises dragging and dropping the second positionable sort icon using the movable interface symbol.

17. The computer program product for providing a process for multiple column data sorting of claim 15, wherein;
the first positionable sort icon is a visually designated primary positionable sort icon; and
the second positionable sort icon is a visually designated secondary positionable sort icon.

18. A computer program product for providing a process for multiple row data sorting comprising:
a computer readable medium;
and computer program code, encoded on the computer readable medium, comprising computer readable instructions for:
providing a user interface for interacting with a table of data, the table of data comprising data arranged in columns and rows;
providing a user interface for interacting with the table of data;
providing a sort icon well, the sort icon well comprising two or more positionable sort icons;
selecting a first row of the table of data to be a primary sort row;
enabling a user to move a first positionable sort icon from the sort icon well to the first row, thereby designating the first row as a primary sort row;
performing a primary sort of the data in the table of data based on the designated primary sort row;
selecting a second row of the table of data to be a secondary sort row;
enabling a user to move a second positionable sort icon from the sort icon well to the second row, thereby designating the second row as a secondary sort row;
performing a secondary sort of the data in the table of data based on the designated primary sort row and the designated secondary sort row.

19. The computer program product for providing a process for multiple row data sorting of claim 18, wherein;
enabling a user to move a first positionable sort icon from the sort icon well to the first row, thereby designating the first row as a primary sort row, comprises dragging and dropping the first positionable sort icon using a movable interface symbol; and
enabling a user to move a second positionable sort icon from the sort icon well to the second row, thereby designating the second row as a secondary sort row, comprises dragging and dropping the second positionable sort icon using the movable interface symbol.

20. The computer program product for providing a process for multiple row data sorting of claim 18, wherein;
the first positionable sort icon is a visually designated primary positionable sort icon; and
the second positionable sort icon is a visually designated secondary positionable sort icon.

21. A computer program product for providing a process for multiple column data sorting comprising:
a computer readable medium;
and computer program code, encoded on the computer readable medium, comprising computer readable instructions for:
providing a user interface for interacting with a table of data, the table of data comprising data arranged in columns and rows;
providing a user interface for interacting with the table of data;
providing a movable interface symbol through the user interface;
performing a defined primary sort action, thereby transforming the movable interface symbol into a movable primary sort symbol;
selecting a first column of the table of data to be a primary sort column;
enabling a user to move the movable primary sort symbol to the first column;
activating the movable primary sort symbol, thereby designating the first column as a primary sort column;
performing a primary sort of the data in the table of data based on the designated primary sort column;
performing a defined secondary sort action, thereby transforming the movable interface symbol into a movable secondary sort symbol;
selecting a second column of the table of data to be a secondary sort column;
enabling a user to move the movable secondary sort symbol to the second column;
activating the movable secondary sort symbol, thereby designating the second column as a secondary sort column;
performing a secondary sort of the data in the table of data based on the designated primary sort column and the designated secondary sort column.

22. The computer program product for providing a process for multiple column data sorting of claim 21, wherein;
the movable interface symbol is a cursor controlled by a user interface device.

23. The computer program product for providing a process for multiple column data sorting of claim 21, wherein;
the movable interface symbol is controlled by at least one user interface device and activating the movable primary sort symbol and activating the movable secondary sort symbol is performed through at least one user interface device.

24. The computer program product for providing a process for multiple column data sorting of claim 21, wherein;
the movable primary sort symbol is a visually designated movable primary sort symbol; and
the movable secondary sort symbol is a visually designated movable secondary sort symbol.

25. A computer program product for providing a process for multiple row data sorting comprising:
a computer readable medium;
and computer program code, encoded on the computer readable medium, comprising computer readable instructions for:
providing a user interface for interacting with a table of data, the table of data comprising data arranged in columns and rows;
providing a user interface for interacting with the table of data;
providing a movable interface symbol through the user interface;
performing a defined primary sort action, thereby transforming the movable interface symbol into a movable primary sort symbol;
selecting a first row of the table of data to be a primary sort row;
enabling a user to move the movable primary sort symbol to the first row;
activating the movable primary sort symbol, thereby designating the first row as a primary sort row;
performing a primary sort of the data in the table of data based on the designated primary sort row;

performing a defined secondary sort action, thereby transforming the movable interface symbol into a movable secondary sort symbol;

selecting a second row of the table of data to be a secondary sort row;

enabling a user to move the movable secondary sort symbol to the second row;

activating the movable secondary sort symbol, thereby designating the second row as a secondary sort row;

performing a secondary sort of the data in the table of data based on the designated primary sort row and the designated secondary sort row.

26. The computer program product for providing a process for multiple row data sorting of claim 25, wherein;

the movable interface symbol is a cursor controlled by a user interface device.

27. The computer program product for providing a process for multiple row data sorting of claim 25, wherein;

the movable interface symbol is controlled by at least one user interface device and activating the movable primary sort symbol and activating the movable secondary sort symbol is performed through at least one user interface device.

28. The computer program product for providing a process for multiple row data sorting of claim 25, wherein;

the movable primary sort symbol is a visually designated movable primary sort symbol; and the movable secondary sort symbol is a visually designated movable secondary sort symbol.

29. A method for multiple column data sorting comprising:

providing a table of data comprising data arranged in columns and rows on a display device, the display device being associated with a computing system;

providing a user interface for interacting with the table of data on the display device;

providing a sort icon well in the user interface, the sort icon well comprising two or more positionable sort icons for interacting with the table of data on the display device;

selecting a first column of the table of data to be a primary sort column;

moving a first positionable sort icon from the sort icon well to the first column, thereby designating the first column as a primary sort column using a user interface device associated with the computing system;

performing a primary sort of the data in the table of data based on the designated primary sort column using a processor associated with the computing system;

selecting a second column of the table of data to be a secondary sort column;

moving a second positionable sort icon from the sort icon well to the second column, thereby designating the second column as a secondary sort column using a user interface device associated with the computing system;

performing a secondary sort of the data in the table of data based on the designated primary sort column and the designated secondary sort column using a processor associated with the computing system.

30. The method for multiple column data sorting of claim 29, wherein;

moving a first positionable sort icon from the sort icon well to the first column using a user interface device associated with the computing system, thereby designating the first column as a primary sort column, comprises dragging and dropping the first positionable sort icon using a movable interface symbol using a user interface device associated with the computing system; and moving a second positionable sort icon from the sort icon well to the second column using a user interface device associated with the computing system, thereby designating the second column as a secondary sort column, comprises dragging and dropping the second positionable sort icon using the movable interface symbol using a user interface device associated with the computing system.

31. The method for multiple column data sorting of claim 29, wherein;

the first positionable sort icon is a visually designated primary positionable sort icon; and the second positionable sort icon is a visually designated positionable secondary sort icon.

32. A method for multiple row data sorting comprising:

providing a table of data comprising data arranged in columns and rows on a display device, the display device being associated with a computing system;

providing a user interface for interacting with the table of data on the display device;

providing a sort icon well in the user interface, the sort icon well comprising two or more positionable sort icons for interacting with the table of data on the display device;

selecting a first row of the table of data to be a primary sort row;

moving a first positionable sort icon from the sort icon well to the first row, thereby designating the first row as a primary sort row using a user interface device associated with the computing system;

performing a primary sort of the data in the table of data based on the designated primary sort row using a processor associated with the computing system;

selecting a second row of the table of data to be a secondary sort row;

moving a second positionable sort icon from the sort icon well to the second row, thereby designating the second row as a secondary sort row using a user interface device associated with the computing system;

performing a secondary sort of the data in the table of data based on the designated primary sort row and the designated secondary sort row using a processor associated with the computing system.

33. The method for multiple row data sorting of claim 32, wherein;

moving a first positionable sort icon from the sort icon well to the first row using a user interface device associated with the computing system, thereby designating the first row as a primary sort row, comprises dragging and dropping the first positionable sort icon using a movable interface symbol; and moving a second positionable sort icon from the sort icon well to the second row using a user interface device associated with the computing system, thereby designating the second row as a secondary sort row, comprises dragging and dropping the second positionable sort icon using the movable interface symbol.

34. The method for multiple column data sorting of claim 32, wherein;

the first positionable sort icon is a visually designated primary positionable sort icon; and the second positionable sort icon is a visually designated secondary positionable sort icon.

35. A method for multiple column data sorting comprising:

providing a table of data comprising data arranged in columns and rows on a display device, the display device being associated with a computing system;

providing a user interface for interacting with the table of data on the display device;

providing a movable interface symbol through the user interface;

performing a defined primary sort action, thereby transforming the movable interface symbol into a movable primary sort symbol;

selecting a first column of the table of data to be a primary sort column;

moving the movable primary sort symbol to the first column;

activating the movable primary sort symbol, thereby designating the first column as a primary sort column;

performing a primary sort of the data in the table of data based on the designated primary sort column;

performing a defined secondary sort action, thereby transforming the movable interface symbol into a movable secondary sort symbol;

selecting a second column of the table of data to be a secondary sort column;

moving the movable secondary sort symbol to the second column;

activating the movable secondary sort symbol, thereby designating the second column as a secondary sort column;

performing a secondary sort of the data in the table of data based on the designated primary sort column and the designated secondary sort column.

36. The method for multiple column data sorting of claim 35, wherein;

the movable interface symbol is a cursor controlled by a user interface device.

37. The method for multiple column data sorting of claim 35, wherein;

the movable interface symbol is controlled by at least one user interface device and activating the movable primary sort symbol and activating the movable secondary sort symbol is performed through at least one user interface device.

38. The method for multiple column data sorting of claim 35, wherein;

the movable primary sort symbol is a visually designated movable primary sort symbol; and the movable secondary sort symbol is a visually designated movable secondary sort symbol.

39. A method for multiple row data sorting comprising:

providing a table of data comprising data arranged in columns and rows on a display device, the display device being associated with a computing system;

providing a user interface for interacting with the table of data on the display device;

providing a movable interface symbol through the user interface;

performing a defined primary sort action, thereby transforming the movable interface symbol into a movable primary sort symbol;

selecting a first row of the table of data to be a primary sort row;

moving the movable primary sort symbol to the first row;

activating the movable primary sort symbol, thereby designating the first row as a primary sort row;

performing a primary sort of the data in the table of data based on the designated primary sort row;

performing a defined secondary sort action, thereby transforming the movable interface symbol into a movable secondary sort symbol;

selecting a second row of the table of data to be a secondary sort row;

moving the movable secondary sort symbol to the second row;

activating the movable secondary sort symbol, thereby designating the second row as a secondary sort row;

performing a secondary sort of the data in the table of data based on the designated primary sort row and the designated secondary sort row.

40. The method for multiple row data sorting of claim 39, wherein;

the movable interface symbol is a cursor controlled by a user interface device.

41. The method for multiple row data sorting of claim 39, wherein;

the movable interface symbol is controlled by at least one user interface device and activating the movable primary sort symbol and activating the movable secondary sort symbol is performed through at least one user interface device.

42. The method for multiple row data sorting of claim 39, wherein;

the movable primary sort symbol is a visually designated movable primary sort symbol; and the movable secondary sort symbol is a visually designated movable secondary sort symbol.

* * * * *